US 6,553,383 B1

(12) United States Patent
Martin

(10) Patent No.: US 6,553,383 B1
(45) Date of Patent: Apr. 22, 2003

(54) DEVICE FOR DATA ANALYSIS AND ORGANIZATION

(76) Inventor: Guillaume Martin, 142, rue de la Pompe, F-75016 Paris (FR)

( * ) Notice: Subject to any disclaimer, the term of this patent is extended or adjusted under 35 U.S.C. 154(b) by 0 days.

(21) Appl. No.: 09/445,751
(22) PCT Filed: May 20, 1998
(86) PCT No.: PCT/FR98/01015
§ 371 (c)(1), (2), (4) Date: Mar. 15, 2000
(87) PCT Pub. No.: WO98/57272
PCT Pub. Date: Dec. 17, 1998

(30) Foreign Application Priority Data

Jun. 12, 1997 (FR) ............................................. 97 07305

(51) Int. Cl.⁷ ............................................. G06F 17/30
(52) U.S. Cl. ....................................................... 707/102
(58) Field of Search ......................................... 707/102

(56) References Cited

U.S. PATENT DOCUMENTS

| 5,481,703 A | | 1/1996 | Kato | |
|---|---|---|---|---|
| 5,627,979 A | * | 5/1997 | Chang et al. | 345/763 |
| 5,832,496 A | * | 11/1998 | Anand et al. | 707/102 |
| 5,870,746 A | * | 2/1999 | Knutson et al. | 707/101 |
| 5,918,232 A | * | 6/1999 | Pouschine et al. | 707/103 |
| 6,026,398 A | * | 2/2000 | Brown et al. | 707/5 |
| 6,061,515 A | * | 5/2000 | Chang et al. | 717/2 |
| 6,076,091 A | * | 6/2000 | Fohn et al. | 707/102 |
| 6,243,713 B1 | * | 6/2000 | Nelson et al. | 707/104.1 |
| 6,138,121 A | * | 10/2000 | Costa | 707/100 |
| 6,263,335 B1 | * | 7/2001 | Paik et al. | 707/5 |

OTHER PUBLICATIONS

Christian Soutou et al.; Automatic Generation of SQL Queries to Improve Knowledge Discovery in Relational Databases; *Practical Application Co,*; pp 227–242;1997.

\* cited by examiner

*Primary Examiner*—Wayne Amsbury
(74) *Attorney, Agent, or Firm*—Rabin & Berdo, P.C.

(57) ABSTRACT

The invention relates to a data processing device comprising a database management system (470). The management system (470) can cooperate with an operating system so as to allow the user the creation/input and/or the use of a database comprising at least one data table (475) which can be broken down into rows and columns. According to the invention, the device furthermore comprises: an autonomous meta-dictionary (510) for dynamically storing chosen information relating to the structure of each table of the database, and to the relationships between tables, an analysis means (530) capable of determining and of storing at least temporarily a representation of groups of interrelated columns, and a restructuring module (580, 590) capable of cooperating with the analysis means and the meta-dictionary with a view to establishing for the user a presentation of the database which takes account of at least one group of thus related columns.

19 Claims, 22 Drawing Sheets

Figure 1:
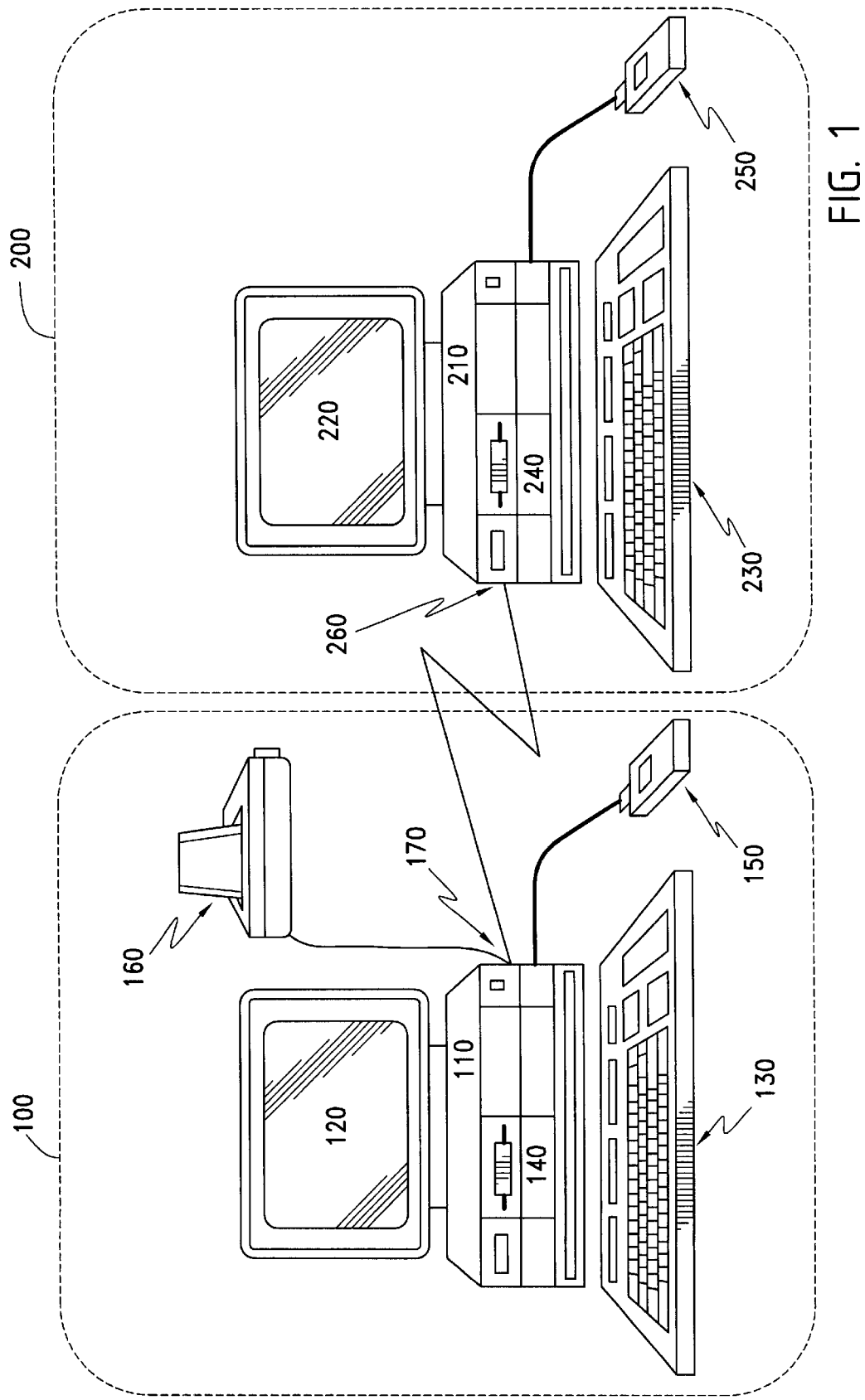

The table names are in BOLD
The primary keys are underlined
The external keys are in *italics*

| C_ID | C_DESC | C_SN | P_SN | COST |
|---|---|---|---|---|
| SCR17 | 17 IN SCREEN | 11 | US1 | 400 |
| P166 | PENTIUM 166 | 13 | US1 | 500 |
| HD1.2 | 1.2 GB hard disk | 14 | US1 | 200 |
| SCR14 | 14 IN SCREEN | 15 | SVR1 | 200 |
| P200 | PENTIUM 200 | 16 | SVR1 | 700 |
| HD2 | 2 GB hard disk | 17 | SVR1 | 250 |
| HD2 | 2 GB hard disk | 18 | SVR1 | 250 |
| SCR15 | 15 IN SCREEN | 19 | US2 | 300 |
| P166 | PENTIUM 166 | 20 | US2 | 500 |
| HD1.2 | 1.2 GB hard disk | 21 | US2 | 200 |

<u>FIG. 5 (components table)</u>

| P_ID | P_NAME | P_SN | CATEG |
|---|---|---|---|
| COMP1 | USER COMPUTER | US1 | USER |
| COMP2 | SERVER COMPUTER | SVR1 | SERVER |
| COMP3 | USER COMPUTER | US2 | USER |

<u>FIG. 5A (products table)</u>

| C_ID | C_DESC | C_SN | P_ID | P_NAME | P_SN | CATEG | COST |
|---|---|---|---|---|---|---|---|
| SCR17 | 17 IN SCREEN | 11 | COMP1 | USER COMPUTER | US1 | USER | 400 |
| P166 | PENTIUM 166 | 13 | COMP1 | USER COMPUTER | US1 | USER | 500 |
| HD1.2 | 1.2 GB hard disk | 14 | COMP1 | USER COMPUTER | US1 | USER | 200 |
| SCR14 | 14 IN SCREEN | 15 | COMP2 | SERVER COMPUTER | SVR1 | SERVER | 200 |
| P200 | PENTIUM 200 | 16 | COMP2 | SERVER COMPUTER | SVR1 | SERVER | 700 |
| HD2 | 2 GB hard disk | 17 | COMP2 | SERVER COMPUTER | SVR1 | SERVER | 250 |
| HD2 | 2 GB hard disk | 18 | COMP2 | SERVER COMPUTER | SVR1 | SERVER | 250 |
| SCR15 | 15 IN SCREEN | 19 | COMP3 | USER COMPUTER | US2 | USER | 300 |
| P166 | PENTIUM 166 | 20 | COMP3 | USER COMPUTER | US2 | USER | 500 |
| HD1.2 | 1.2 GB hard disk | 21 | COMP3 | USER COMPUTER | US2 | USER | 200 |

<u>FIG. 7 (components_and_products table, I)</u>

| C_ID | C_DESC | C_SN | P_ID | P_NAME | P_SN | CATEG | COST |
|---|---|---|---|---|---|---|---|
| SCR17 | 17 IN SCREEN | 11 | COMP1 | USER COMPUTER | US1 | USER | 400 |
| P166 | PENTIUM 166 | 13 | COMP1 | USER COMPUTER BIS | US1 | USER | 500 |
| HD1.2 | 1.2 GB hard disk | 14 | COMP1 | USER COMPUTER | US1 | USER | 200 |
| SCR14 | 14 IN SCREEN | 15 | | SERVER COMPUTER | SVR1 | SERVER | 200 |
| P200 | PENTIUM 200 | 16 | | SERVER COMPUTER | SVR1 | SERVER | 700 |
| HD2 | 2 GB hard disk | 17 | | SERVER COMPUTER | SVR1 | SERVER | 250 |
| HD2 | 2 GB hard disk | 18 | COMP2 | SERVER COMPUTER | SVR1 | SERVER | 250 |
| SCR15 | 15 IN SCREEN | 19 | COMP3 | USER COMPUTER | US2 | USER | 300 |
| P166 | PENTIUM 166 | 20 | COMP3 | USER COMPUTER | US2 | USER | 500 |
| HD1.2 | 1.2 GB hard disk | 21 | COMP3 | USER COMPUTER | US2 | USER | 200 |

<u>FIG. 7A (components_and_products table, II)</u>

| P_ID | P_NAME | P_SN | C_ID | C_DESC | C_SN | CATEG | COST |
|------|--------|------|------|--------|------|-------|------|
| COMP1 | USER COMPUTER | US1 | | | | | |
| | | | SCR17 | 17 IN SCREEN | 11 | USER | 400 |
| | | | P166 | PENTIUM 166 | 13 | USER | 500 |
| | | | HD1.2 | 1.2 GB hard disk | 14 | USER | 200 |
| | | | 3 | Components | | Product Cost = | 1100 |
| COMP2 | SERVER COMPUTER | SVR1 | | | | | |
| | | | SCR14 | 14 IN SCREEN | 15 | SERVER | 200 |
| | | | P200 | PENTIUM 200 | 16 | SERVER | 700 |
| | | | HD2 | 2 GB hard disk | 17 | SERVER | 250 |
| | | | HD2 | 2 GB hard disk | 18 | SERVER | 250 |
| | | | 4 | Components | | Product Cost = | 1400 |
| COMP3 | USER COMPUTER | US2 | | | | | |
| | | | SCR15 | 15 IN SCREEN | 19 | USER | 300 |
| | | | P166 | PENTIUM 166 | 20 | USER | 500 |
| | | | HD1.2 | 1.2 GB hard disk | 21 | USER | 200 |
| | | | 3 | Components | | Product Cost = | 1000 |
| | | | | | | Total Cost = | 3500 |

FIG.6

| P_ID | P_NAME | FREQUENC |
|------|--------|----------|
| COMP1 | USER COMPUTER | 2 |
| COMP1 | USER COMPUTER BIS | 1 |
| <NULL> | SERVER COMPUTER | 3 |

FIG.14

Production form

File Transaction

[Next] [ ] [New] [Delete] [Save] [Start] [Select]

record 1 of 10

C_ID: [HD1.2 ▼]  C_DESC: [1.2 GB hard disk ▼]  C_SN: [14 ▼]  P_ID: [COMP1 ▼]  P_NAME: [USER COMPUTER ▼]

P_SN: [US1 ▼]  CATEG: [USER ▼]  COST: [200 ▼]

FIG. 8

```
Query
SVR1  SERVER COMPUTER  COMP2  15  SCR14  14 IN SCREEN       SERVER  200
SVR1  SERVER COMPUTER  COMP2  16  P200   PENTIUM 200 COMPUTER SERVER 700
SVR1  SERVER COMPUTER  COMP2  18  HD2    2 GB hard disk      SERVER  250
SVR1  SERVER COMPUTER  COMP2  17  HD2    2 GB hard disk      SERVER  250
US1   USER COMPUTER    COMP1  11  SCR17  17 IN SCREEN        USER    400
US1   USER COMPUTER    COMP1  13  P166   PENTIUM 166 COMPUTER USER   500
US1   USER COMPUTER    COMP1  14  HD1.2  1.2 GB hard disk    USER    200
US2   USER COMPUTER    COMP3  19  SCR15  15 IN SCREEN        USER    300
US2   USER COMPUTER    COMP3  20  P166   PENTIUM 166 COMPUTER USER   500
US2   USER COMPUTER    COMP3  21  HD1.2  1.2 GB hard disk    USER    200
```

FIG.9

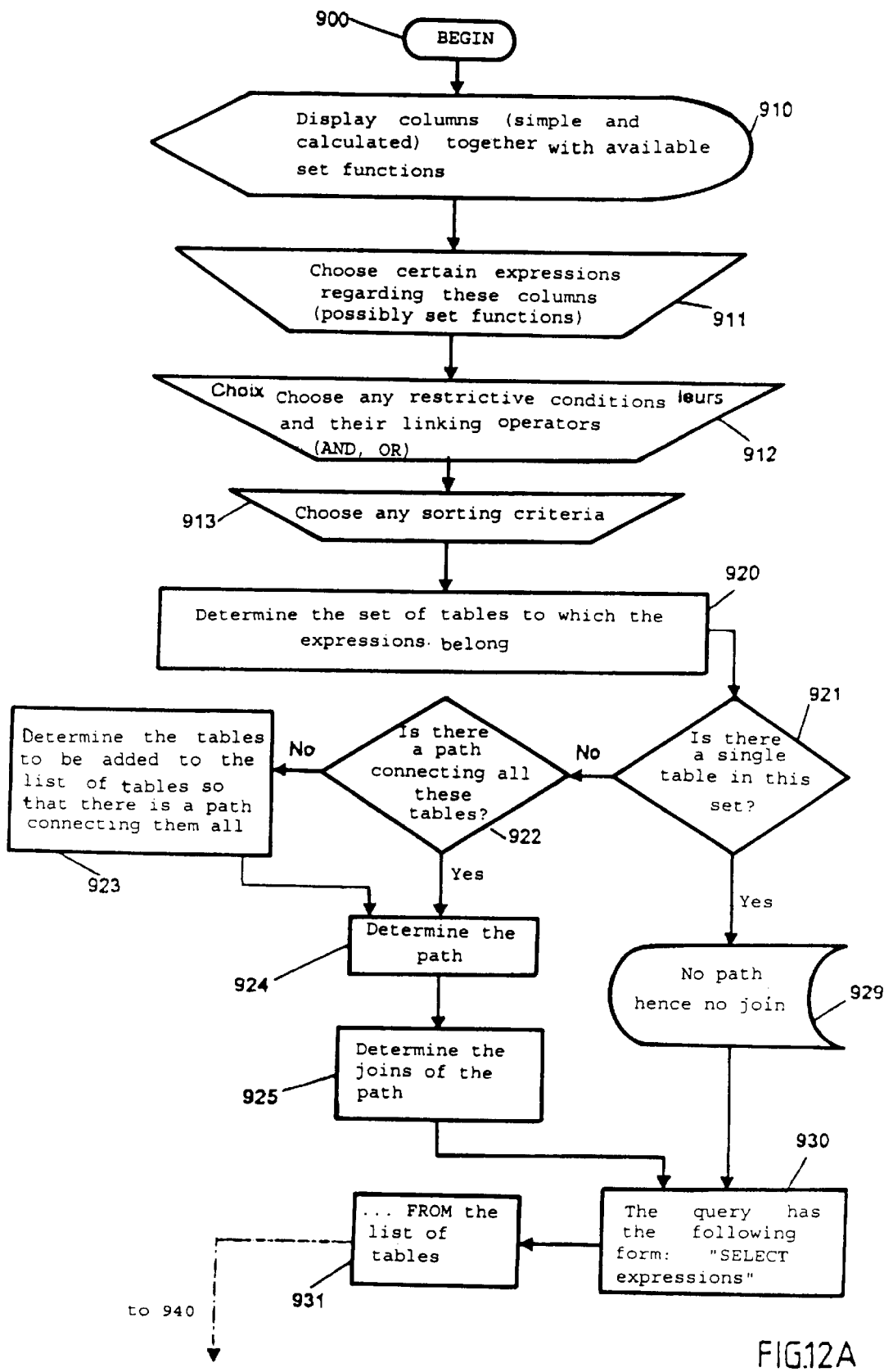

The table names are in BOLD
The primary keys are underlined
The external keys are in *italics*

FIG 18

FIG.18A

DEVICE FOR DATA ANALYSIS AND ORGANIZATION

The present invention relates to systems for processing and storing information of the database type.

Such systems can be rendered accessible to novice users, with the aid of appropriate development tools. These tools are very often used by professionals (persons skilled in the art), since they considerably cut the costs of developing applications geared to a database.

Additionally, it is known that the quality of an application is greatly constrained by the quality of the initial study of the requirements to be satisfied, and consequently by the budget allotted thereto. Now, owing to their "mechanical" formulation, the modules obtained with the aid of the aforesaid tools are generally inflexible. In fact, their flexibility is aimed more toward the tailoring of the user interface than to any variations in the more fundamental requirements.

For these reasons, and also as a function of natural changes in the requirements, it is frequently necessary to modify such an application subsequently. Such a later modification is a very unwieldy task, the magnitude of which grows much faster than the complexity of the relevant application. At present, it is practically inaccessible to non-specialists, whereas, done by specialists, it entails costs which grow rapidly, to the point that it is often less expensive to redo everything each time. This situation, which will be illustrated hereinafter in a very simple example, is obviously unsatisfactory.

The present invention has in particular the aim of affording a solution to this problem.

The data processing device proposed for this purpose is of the type comprising at least one computer, furnished with a central unit with a processor, at least one user peripheral, and a memory, which are run by an operating system, as well as a database management system stored in this computer, and able to cooperate with the operating system so as to allow the user the creation/input and/or the use of a database comprising, for example, at least one data table which can be broken down into rows and columns.

The expression "database management system" is understood here to cover any system of computer files making it possible to manage tables, irrespective of their mode of physical storage.

The invention includes within this device means which may be referred to as a development and assistance tool.

The assistance function is achieved through the fact that, in a means forming an autonomous meta-dictionary, chosen information relating to the structure of the database, typically the tables and the relationships between tables, or equivalent information, is stored dynamically.

Added thereto is an analysis function, which determines and stores (at least temporarily) a representation of groups of columns whose contents are related (related columns are interdependent columns, or, more generally, columns which are dependent on one another).

In practice, the analysis function can involve a statistical tool, suitable for determining interdependencies, and preferably also dependencies, between data sets, by enumerating distinct occurrences, and an analysis (drive) module capable of cooperating with the meta-dictionary and with this statistical tool, so as to obtain and store the said representation of groups of related columns. Advantageously, the statistical tool is based on a means of counting, which preferably operates directly on the columns of each table, in a manner which will be described hereinafter.

The analysis module can be devised so as to repeat the presentation of subgroups of at least two columns, until at least one subgroup is found whose columns are related, or until the possibilities are exhausted. Preferably, it systematically carries out the presentation of all the possible different pairs of columns for the said table, preferably also for all the tables of the database.

On the basis of the analysis, it is possible to undertake a restructuring, so as to establish for the user, at least in create/input mode, a presentation (or "view") of the database which takes account of at least one group of related columns.

The restructuring module, advantageously associated with a user interface module, commences by selecting a starting table to be processed, columns to be processed from among at least one group of related columns, and a primary relationship key for this group of columns.

The restructuring can be performed by constructing a new table with the data of a group of related columns, as well as with a relationship key with the relevant table.

It can also be performed through the fact that in data input mode (form), modify access is restricted by default to a part only of the columns of a group of related columns, the others being simply read accessible, or even inaccessible.

The analysis means and its storage means can operate in different ways, in particular: on request and/or on satisfaction of certain criteria (which may comprise a partial analysis), or else, conversely, continuously, dynamically (optionally in respect of partial analysis only).

The invention can also be expressed in the form of a process applied to a computer, or else in the form of the novel industrial product constituted by the development tool.

Figure 2:
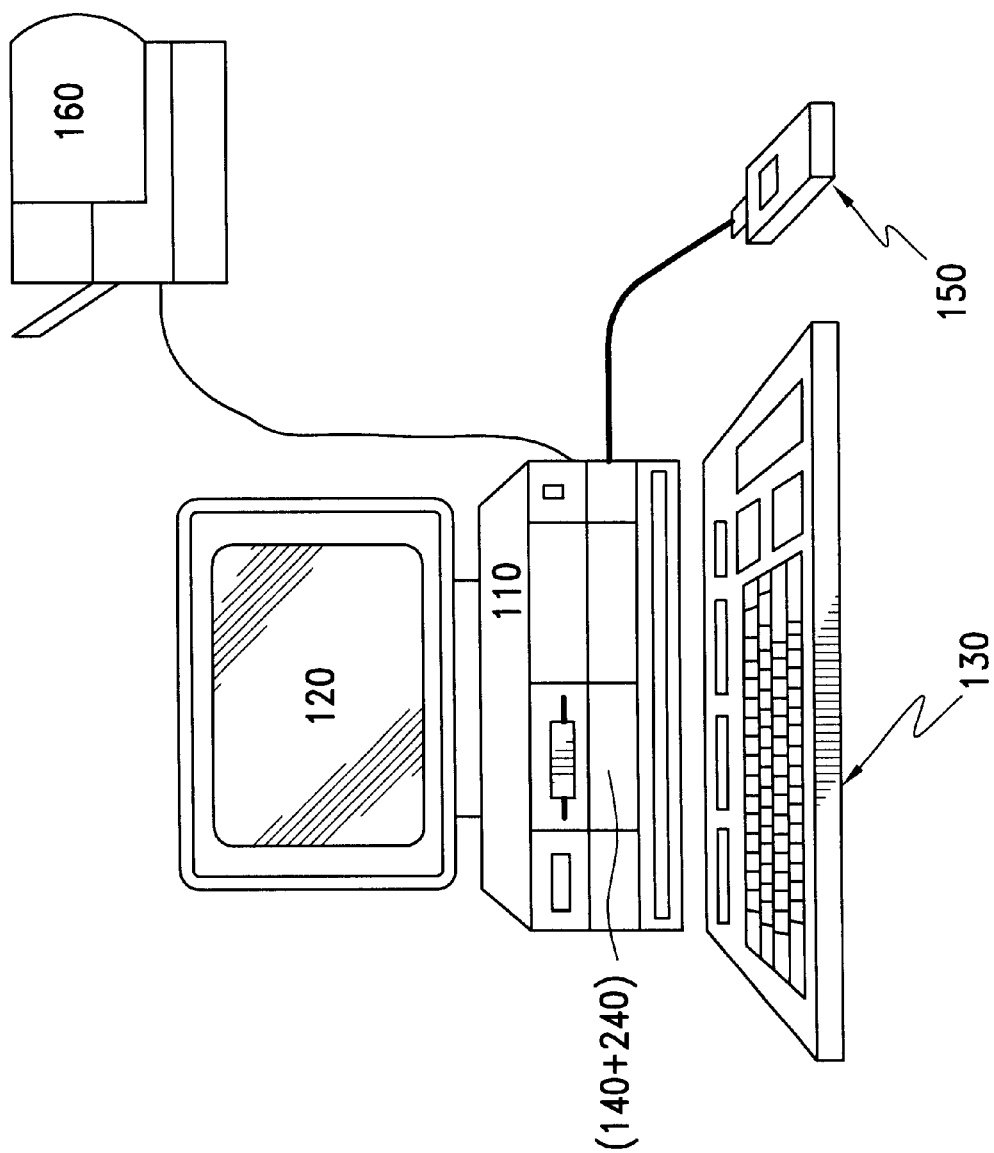
Figure 3:
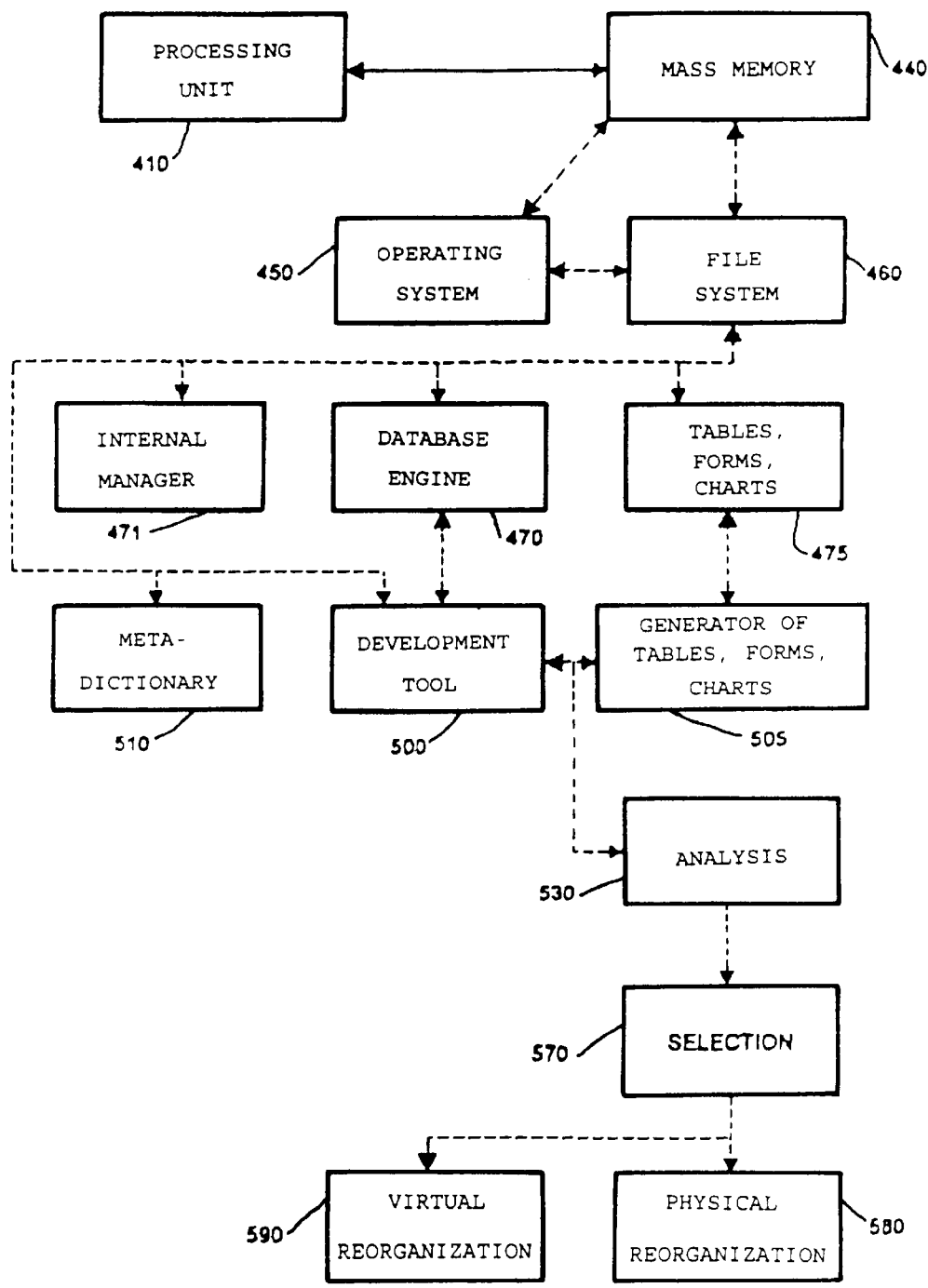
Figure 4:
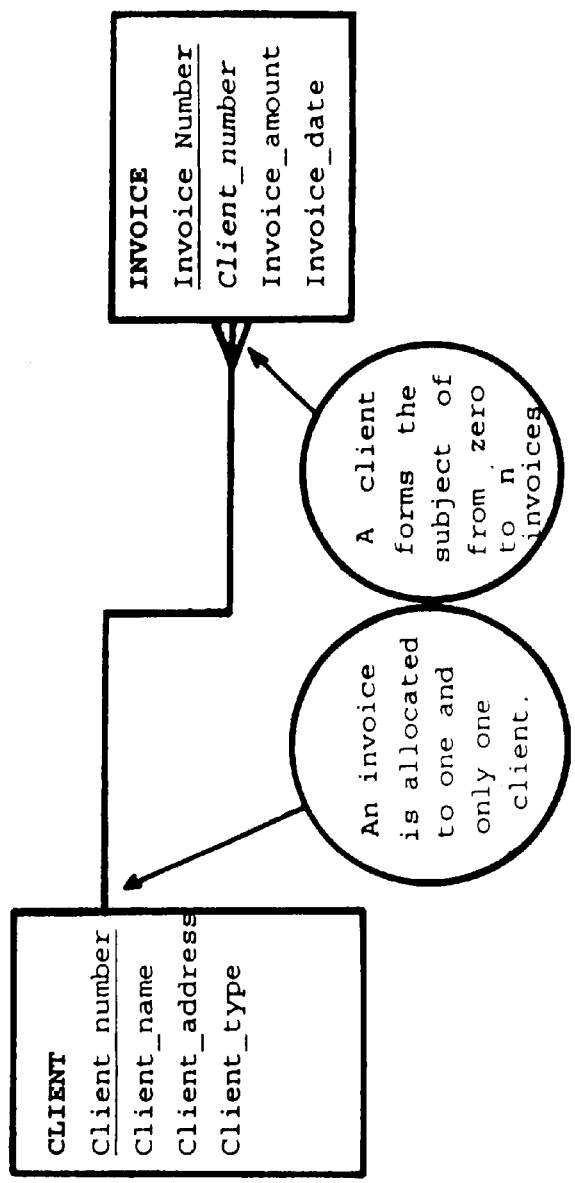
Figure 10:
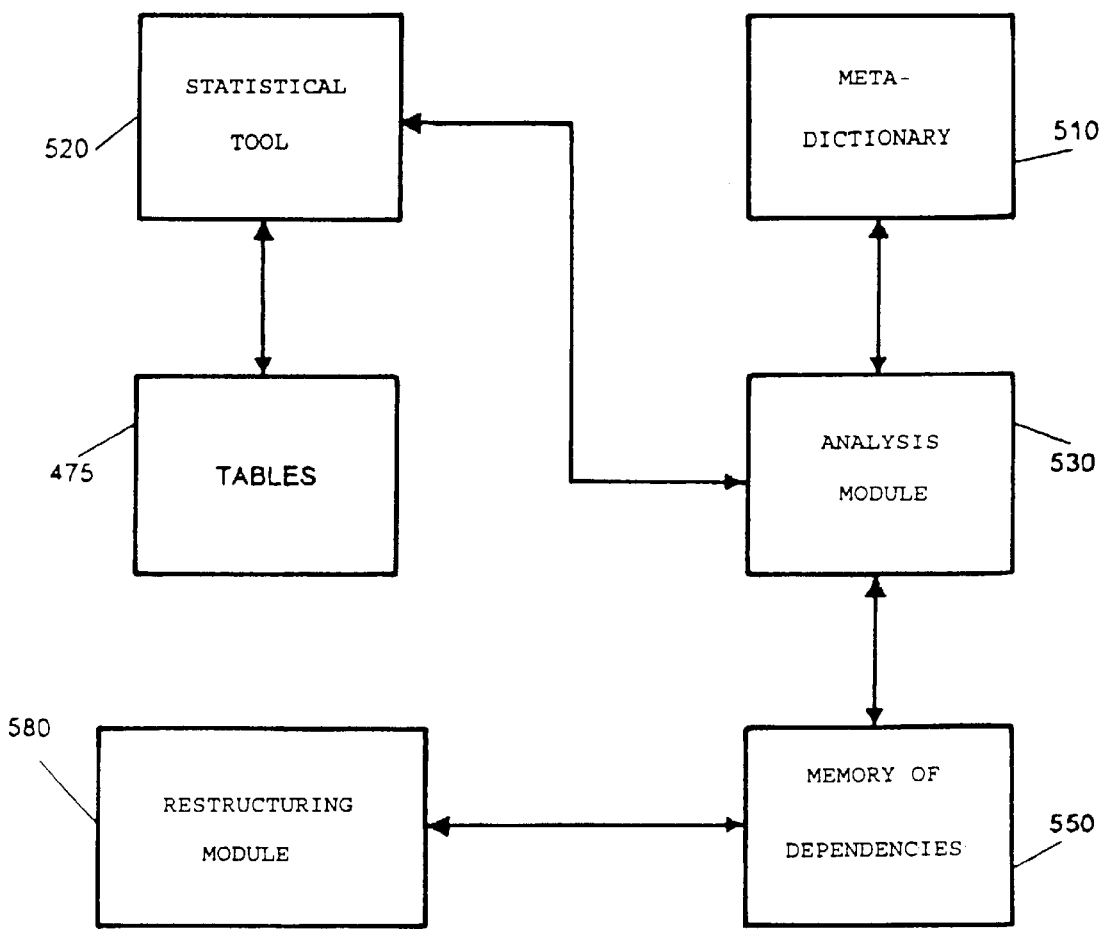
Figure 13A:
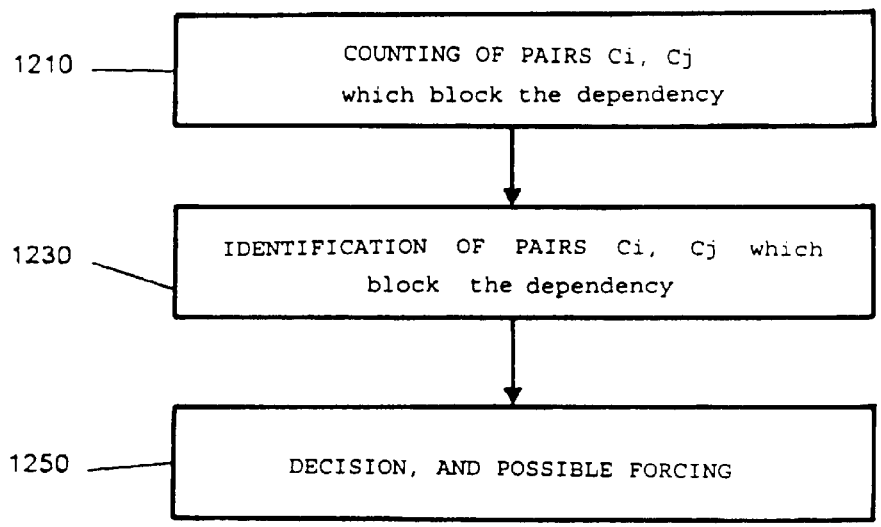
Figure 11:
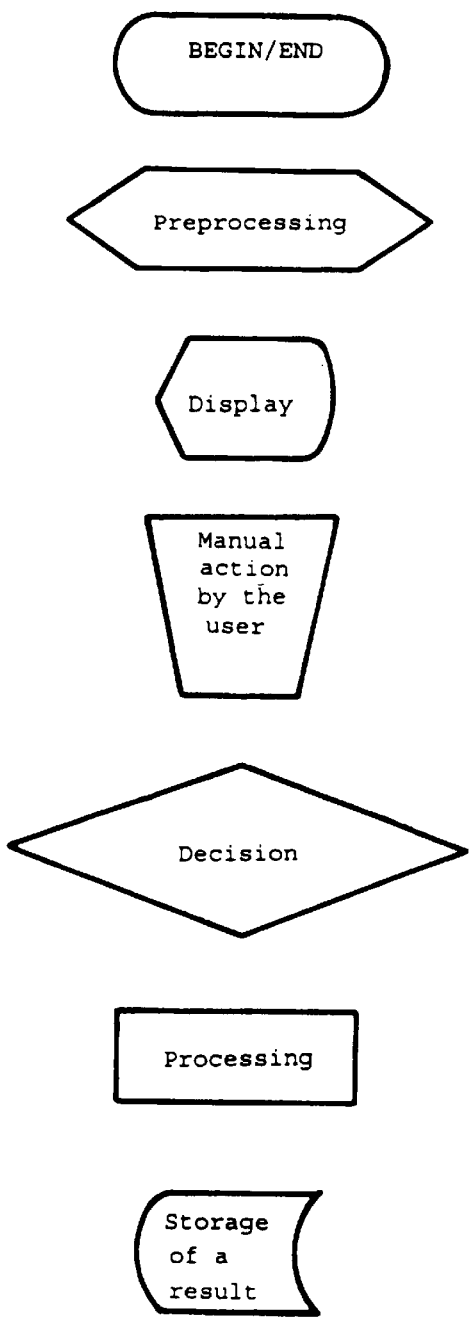
Figure 12B:
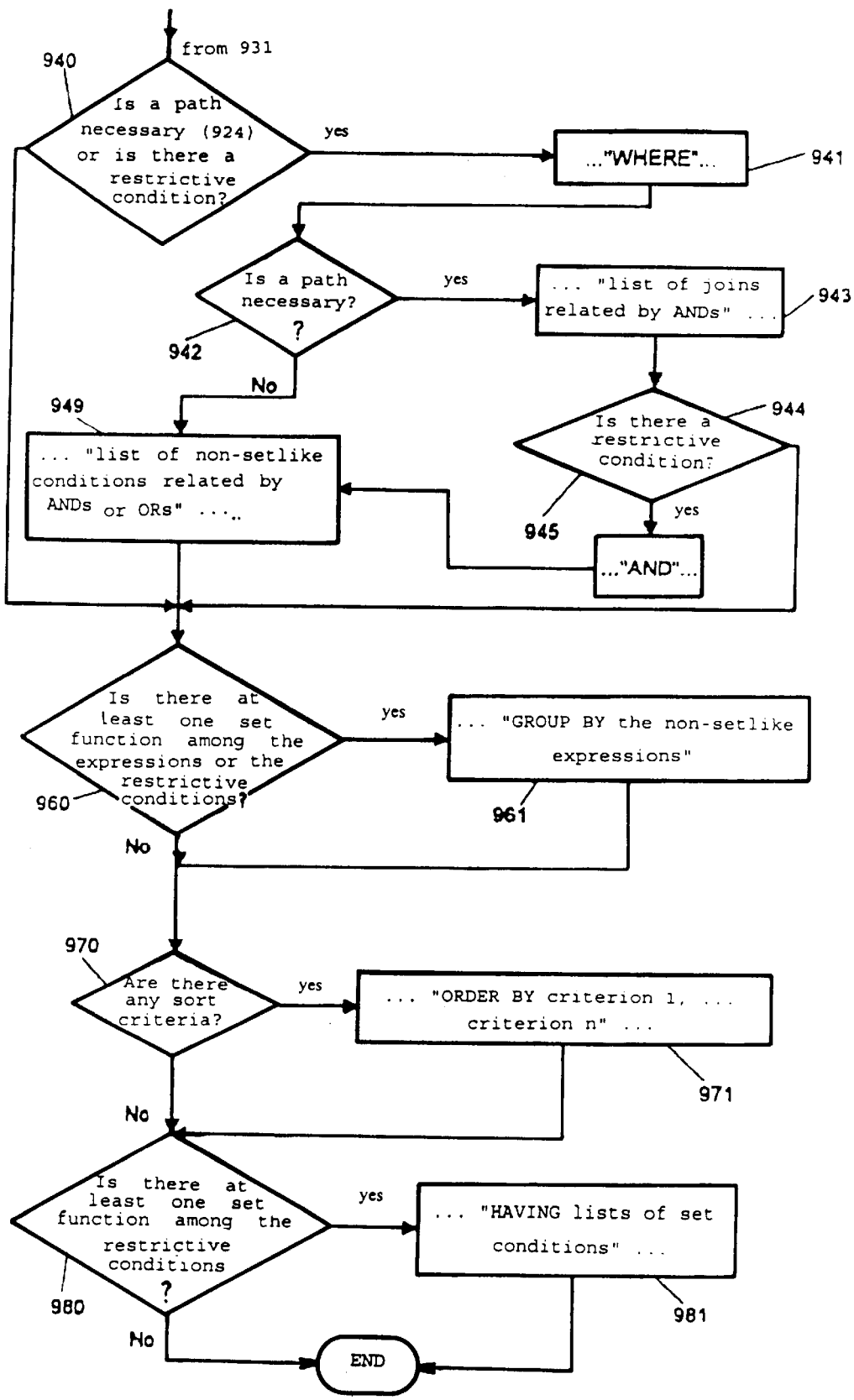
Figure 13:
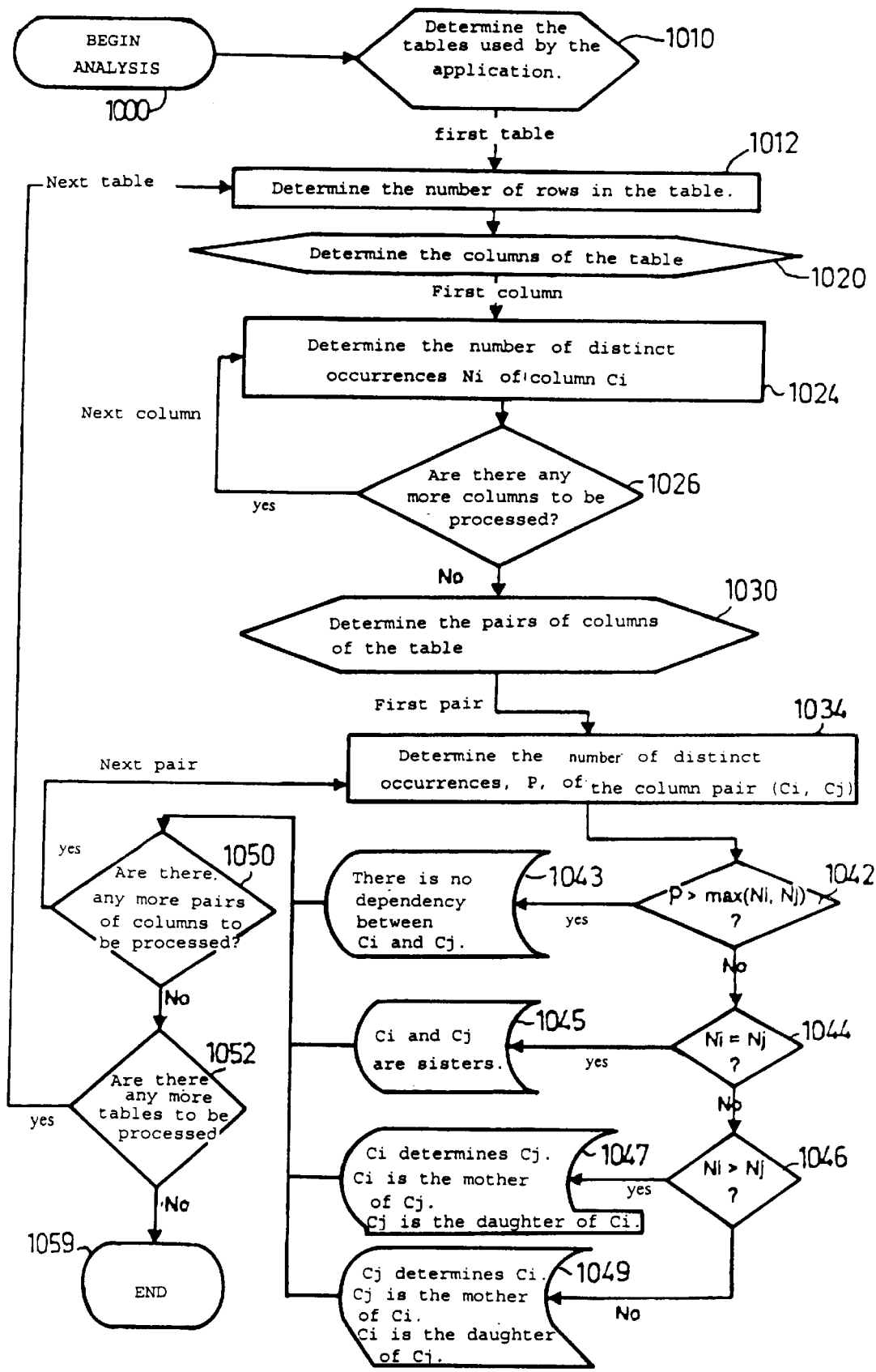
Figure 15:
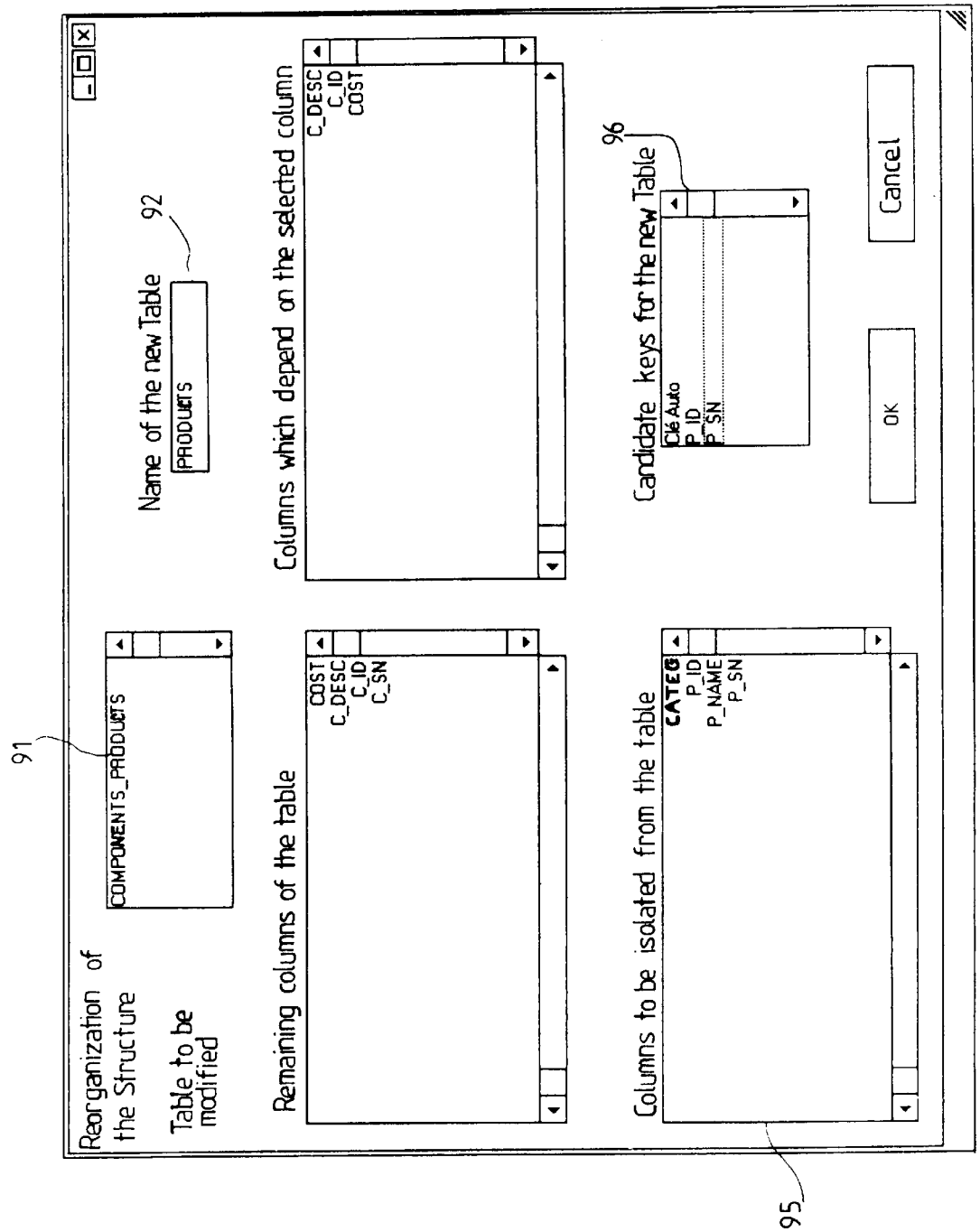
Figure 16A:
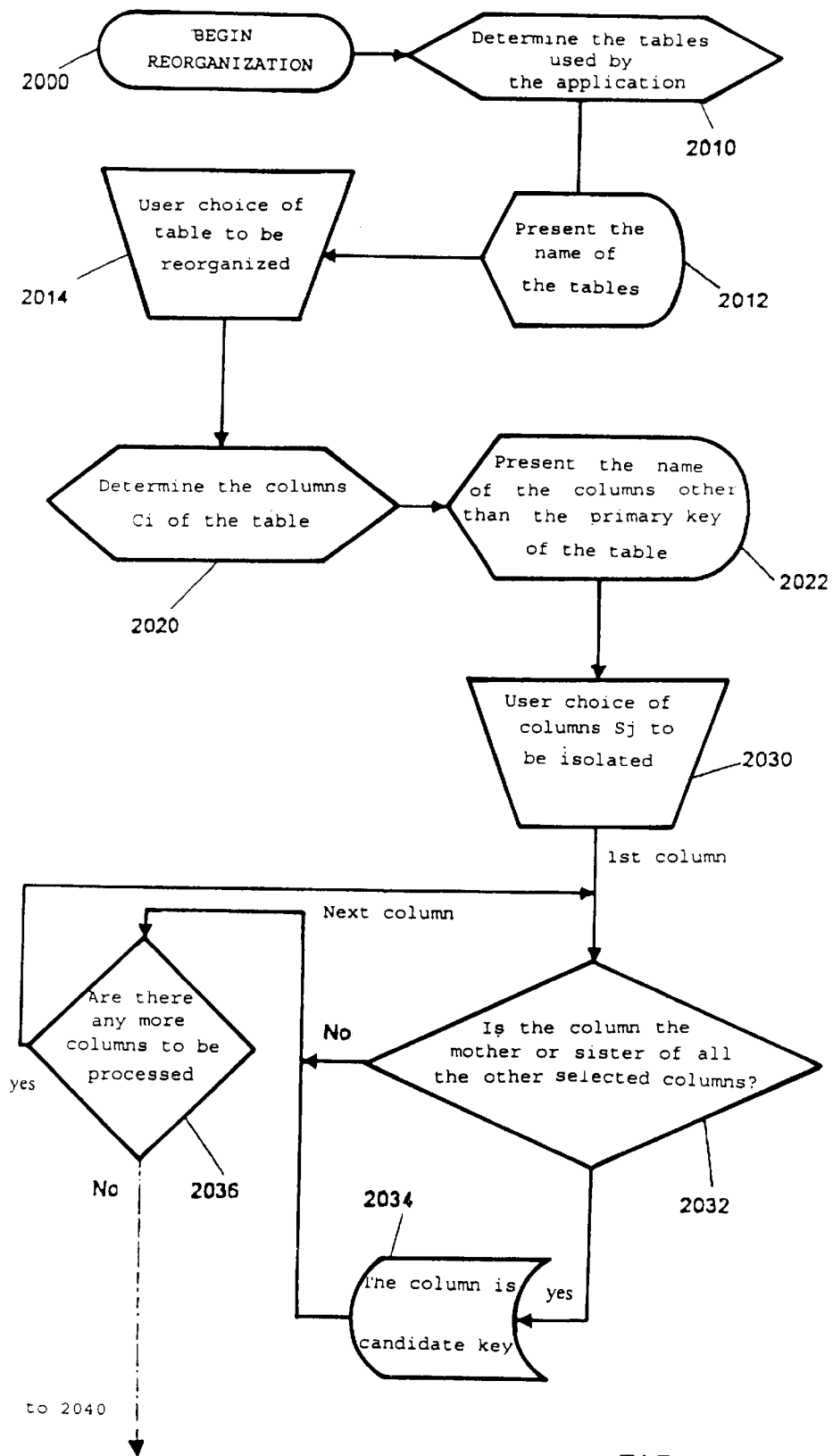
Figure 16:
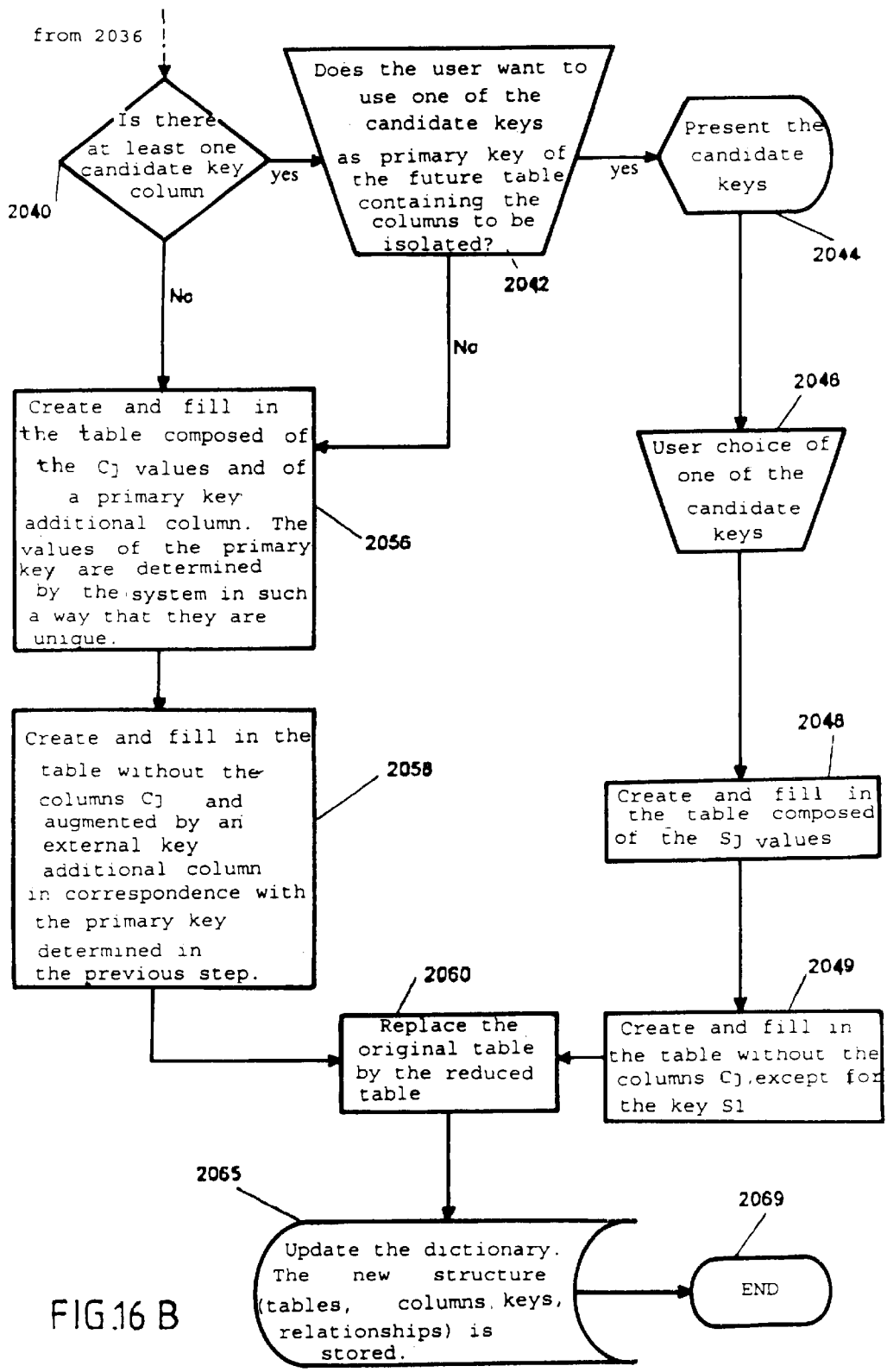
Figure 17:
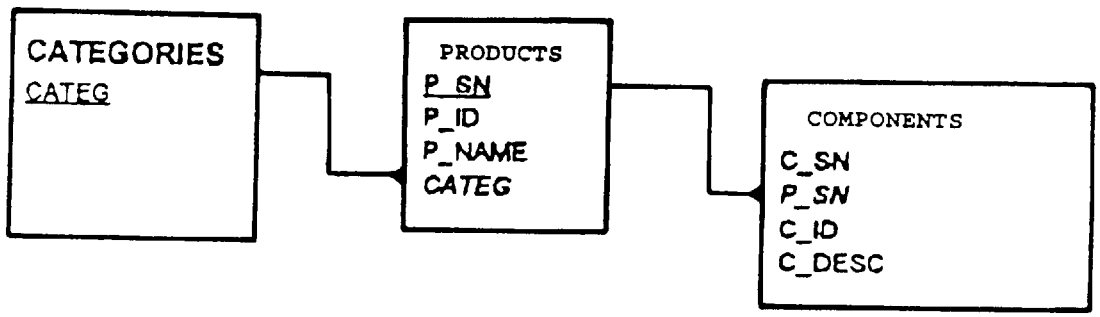
Figure 19:
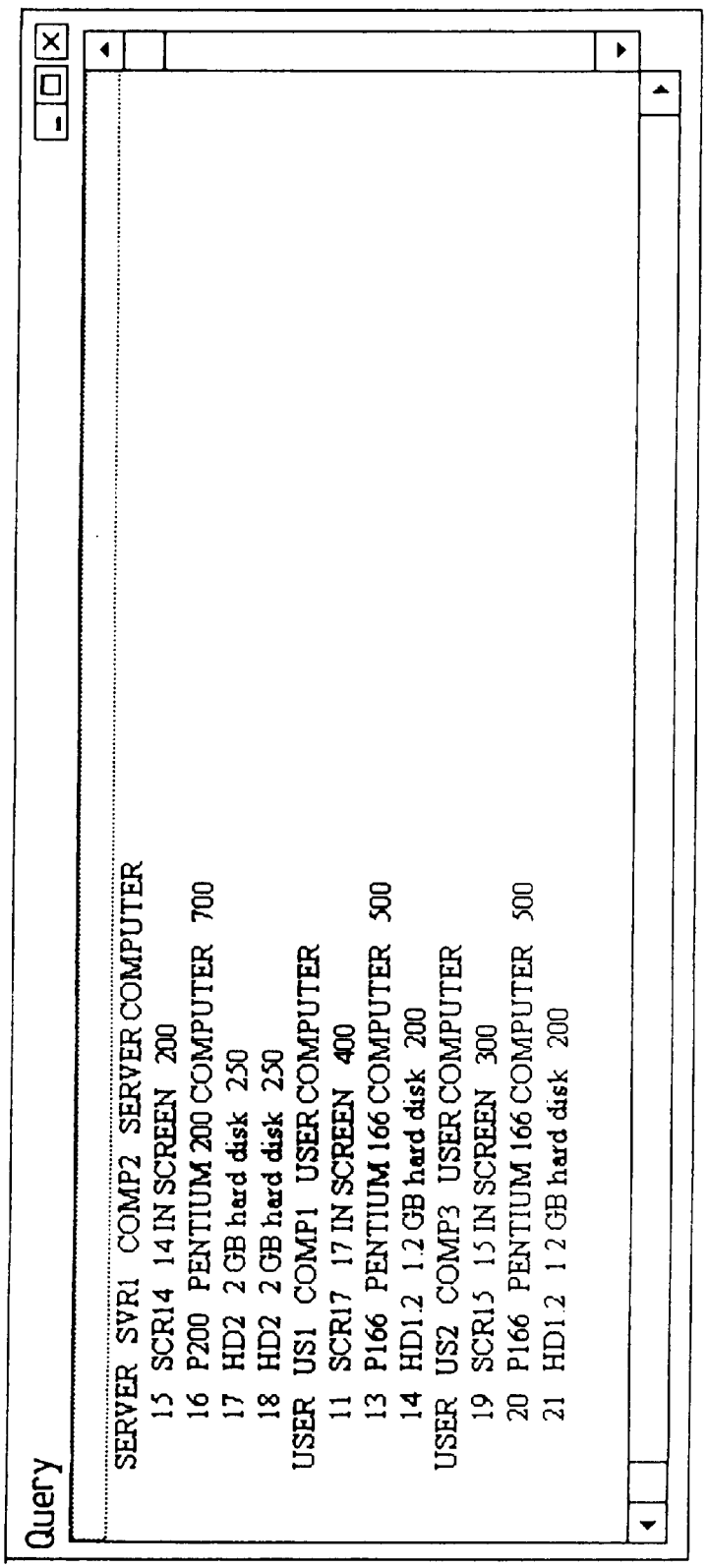
Figure 19A:
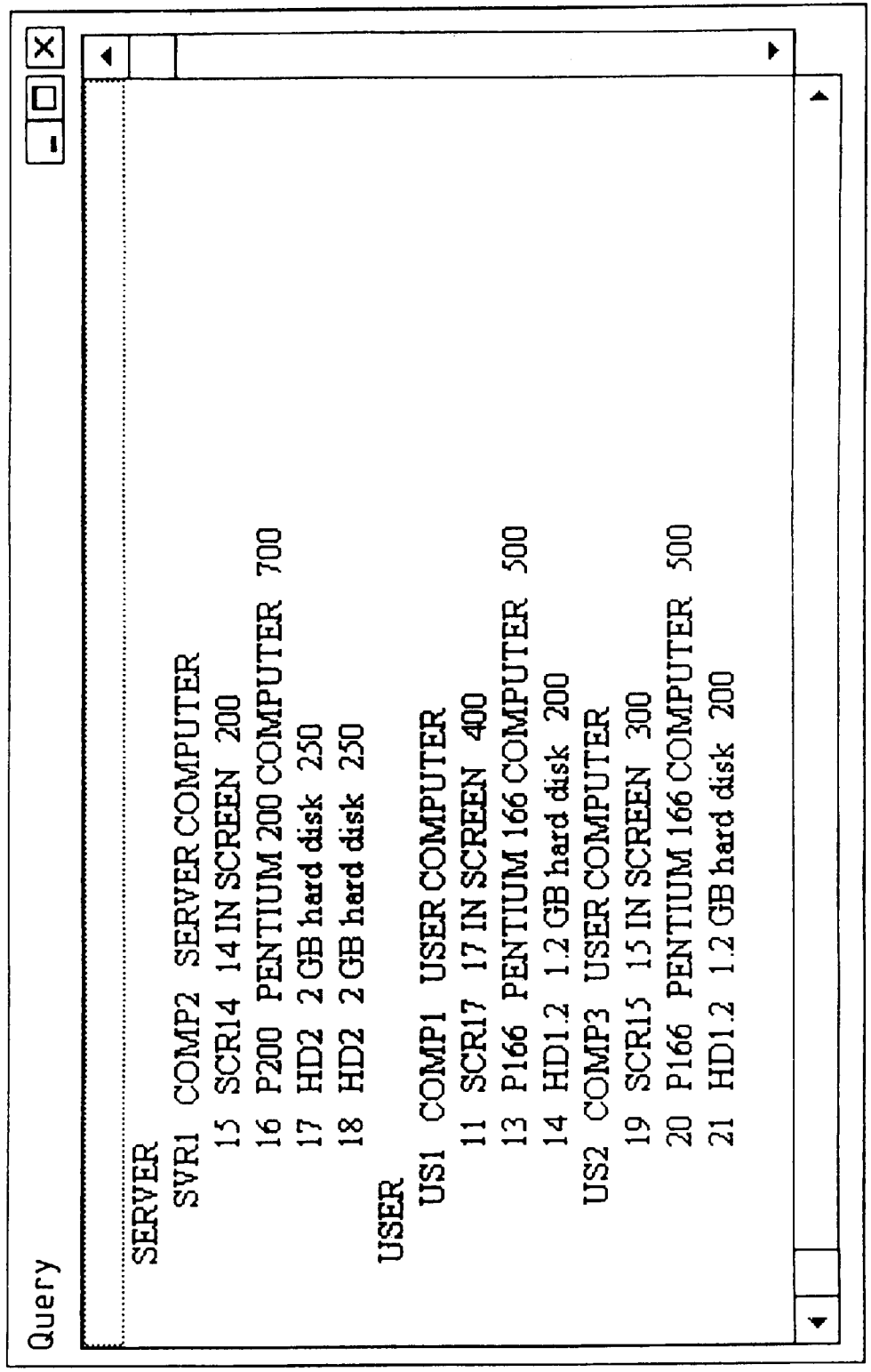
Figure 20:
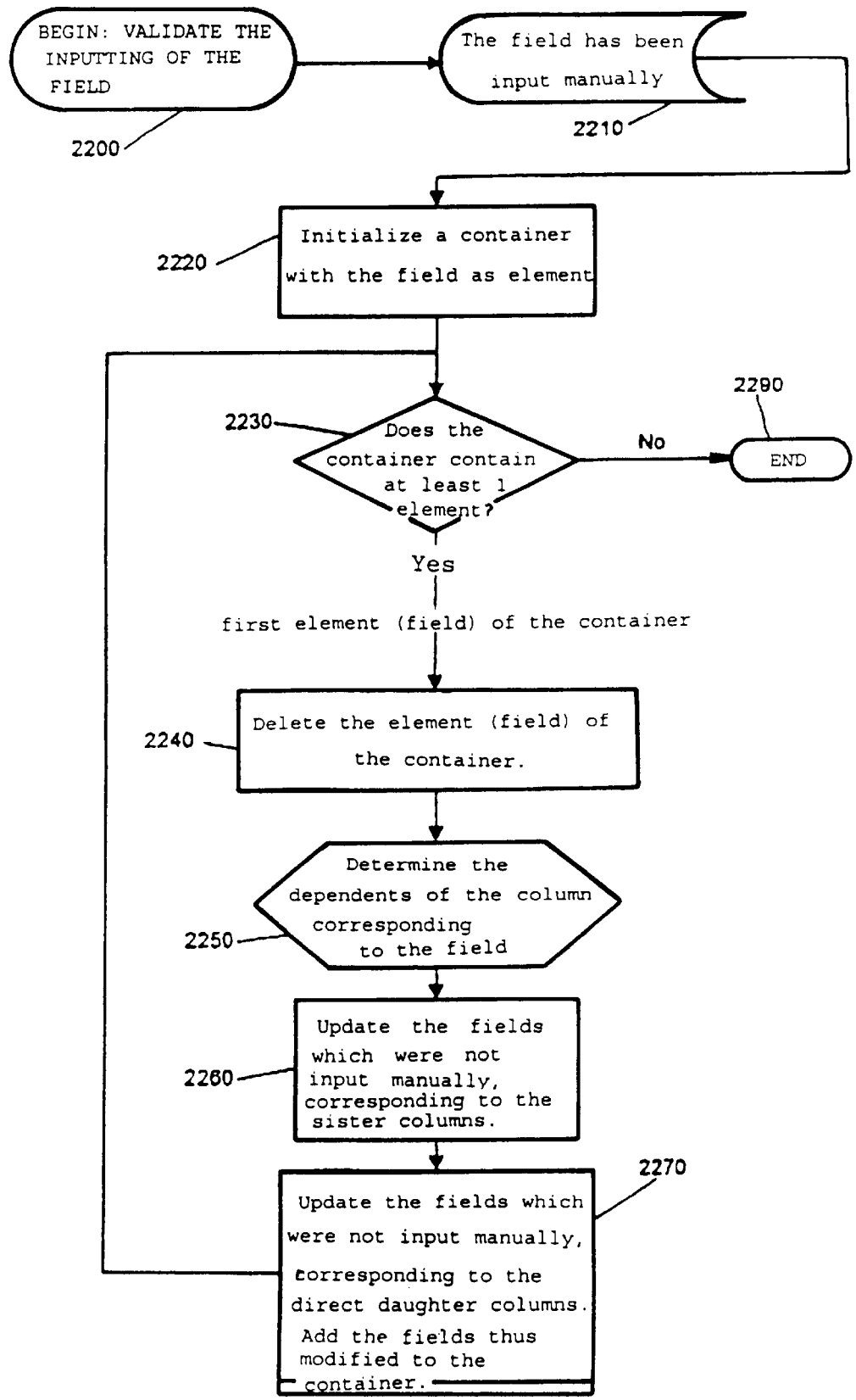

Other characteristics and advantages of the invention will become apparent on examining the detailed description hereinbelow, its appendices, and the appended drawings, in which:

FIGS. 1 and 2 illustrate two exemplary architectures of information processing systems usable according to the invention FIG. 3 illustrates the combination of means within which the invention is manifested, FIG. 4 graphically illustrates a relationship between two tables, FIGS. 5 and 5A illustrate the content of two tables, Components and Products, FIG. 6 illustrates a report relating to the two tables of FIGS. 5 and 5A, FIG. 7 illustrates a single table corresponding to the two tables of FIGS. 5 and 5A, and FIG. 7A illustrates the same single table, but with anomalies of input, FIG. 8 represents the appearance on the screen of a form for inputting information, relating to the components and to the products, managed in one and the same table, FIG. 9 represents the result of an interrogation query on the basis of the monotable structure of FIG. 7, FIG. 10 is the detailed block diagram of the analysis means according to the invention, FIG. 11 illustrates the meaning of the designs of blocks used here in the flow charts, FIG. 12 (split into 12A and 12B) illustrates the operational flow chart of the query builder, FIG. 13 illustrates the operational flow chart of the analysis module, and FIG. 13A illustrates an optional complementary operational flow chart of the analysis module, FIG. 14 represents the result of a false dependency search query on the basis of the monotable structure of FIG. 7A, FIG. 15 shows the selection screen with a view to reorganization, FIG. 16 (split into 16A and 16B) illustrates the operational flow chart of the selection and reorganization modules, FIG. 17 represents the joins of the structure with three tables Components, Products and Categories, FIG. 18 represents the form for inputting the components after the reorganizing of the information relating to the products, and FIG. 18A represents a simplified form for inputting the components after the reorganizing of the information relating to the products, FIG. 19 represents the result of the interrogation query after the reorganizing of the information relating to the products, and FIG. 19A represents the result of the interrogation query after a new reorganizing of the information relating to the product category, and FIG. 20 illustrates the operational flow chart of the virtual reorganization variant.

At the end of the description:

Appendix I recalls certain known concepts, which are useful for understanding the description, Appendix II details in text form certain elements of the invention, and Appendix III consists essentially of SQL commands involved in an exemplary implementation of the invention.

The drawings and appendices to the description are, in essence, of definite character.

Accordingly, they will be able not only to serve in promoting the understanding of the description, but also to contribute to the definition of the invention, as appropriate.

The computer system of FIG. 1 comprises:

- at least one computer 100, the so-called client, with a central unit 110 (CPU, random access memory etc.), a screen 120, a keyboard 130, a mass memory 140 (hard disk for example), a pointing peripheral 150 (mouse for example), a printer 160, and a peripheral 170 making it possible to access a network (local or remote) as well as the corresponding software, and
- a computer 200, the so-called server, comprising a central unit 210 (CPU, random access memory etc.), a screen 220, a keyboard 230, a file storage system 240 (hard disk for example), optionally a pointing system 250, a peripheral 260 making it possible to access the network (local or remote) as well as the corresponding software.

The mass memory (or another memory) of the two computers accommodates an operating system. For the "client", an operating system with graphics interface, such as Windows, OS/2 or MOTIF for example (registered trademarks) will for example be taken. For the server, the graphics interface is less useful in certain cases, and it is possible to take Windows NT, OS/2, Unix, or Novell for example (registered trademarks). The operating system is started up, in a known manner, in general when the computer is booted.

A database is installed on the storage system of the server. Each data item is represented materially by an ordered string of impressions (magnetic, optical, magneto-optical or the like) on the storage medium (disk or the like), which is accessible for example via a language of the SQL type, and with the aid of a database engine, installed on the storage system. On the "client" computer(s) side, it is sufficient to provide programs, recorded on the storage system, making it possible to access the database via an appropriate language, for example the SQL language.

FIG. 2 illustrates a "monostation" configuration integrating some of these elements into a single computer. There is then just one storage peripheral (140+240), and the peripheral allowing access to the network (170) is unnecessary.

Although the invention may be applied to numerous database management systems, or be based on a simple file system, it will initially be supposed in the description that the computer system is furnished with a relational database engine. In this regard, mention is made for all useful purposes of the following works, which are incorporated into the present ones by way of reference:

"Les bases de données relationnelles" [Relational databases], by André FLORY and Frédérique LAFOREST, published by ECONOMICA, 1996, especially chapter 2 thereof, with regard to the fundamentals and the objectives of the relational model in respect of databases, and chapter 4 thereof in respect of the theory of normalization of relational databases, "Relational Databases and Knowledge Bases", by Georges GARDARIN and Patrick VALDURIEZ, published by ADDISON WESLEY, 1989, especially chapter 4 thereof, with regard to the fundamentals and the objectives of the relational model in respect of databases, and chapter 5 thereof in respect of the theory of normalization of relational databases, "Concevoir et développer avec Oracle et Case" [Designing and developing with Oracle and Case], by Hatem SMINE published by Eyrolles, 1994, in particular chapters 9 and 10 thereof, in respect of the techniques and tools for developing applications geared around a relational database, in the exemplary case of the Oracle database and its development tools.

"Using the Oracle toolset", by Mike KROHN published by Addison-Wesley, 1993, in particular chapters 6, 7 and 11 thereof, in respect of the techniques and tools for developing applications geared around a relational database, in the exemplary case of the Oracle database and its development tools.

The information processing chain is illustrated in FIG. 3, with:

at 410, a processing unit, for example one at least of the units 110 and 210 (FIGS. 1 and/or 2);

at 440, the mass memory, for example one at least of the hard disks 140 and 240;

at 450, the operating system which makes it possible to access the physical information of the mass memory, in the form of a file system 460. It will be noted that the physical relationships are shown by solid lines, whilst the logical relationships are shown by dashed lines. The remainder of FIG. 3 depends essentially on the file system, consequently on the mass memory 440 and on the processing unit 410, through the operating system 450.

at 470, the database engine, which accesses the logical data 475.

at 471, an "internal dictionary" (this being the name generally given, in relational databases, to the information about the structure of the database, which is stored in a manner accessible to the database engine, but inaccessible to direct modification by the user-read only).

at 500, the development tool (general part) which accesses the database 475 (tables, forms, status reports, in particular).

As will be seen hereinafter, the development tool 500 works with a generator of tables, forms and status reports 505, a meta-dictionary 510, an analysis module 530, a selection module 570, as well as a physical reorganization module 580 and/or a virtual reorganization module 590.

The fundamental elements of a database are the "tables". Each table is a set of rows; each row is organized as one or more columns; and each column corresponds to a data type. Each row comprises one and only one value (the "data item") for each column of the table. Physically, the storage of the data can correspond to this table-like structure, or else be different.

Each table generally comprises at least one column which contains unique values only (a value is "unique" when it is found only once in the column of the relevant table), or else an equivalent means, row number for example, which may or may not be arranged as a column of the table. This column (or one of them) is then termed the primary key. The value of the primary key allows one-to-one retrieval of the corresponding row, hence the benefit thereof. All the columns which contain unique values only may serve as primary key.

A "details" table has very frequently to reference the information of another table ("master"). For this purpose, in the details table there may be provided a so-called "external key" column, which contains the primary key of the master table. When jointly accessing the data of two tables, these two tables are related by a "join" (master/details relation): when accessing the master table, the external key is used to simultaneously bring up all the corresponding details contained in the details table; conversely, when accessing the details table, the primary key of the master table can be used to simultaneously bring up complementary data contained in the master table. This concept of join or relationship between tables is illustrated by the diagram of FIG. 4, with a table of Clients, and a table of Invoices, in the case of invoicing management.

The present detailed description will focus on another example relating to a production line for computers (the products), which are manufactured by assembling components. It will be seen that two tables "Products" and "Components" can be formulated, having for example the contents illustrated in FIGS. 5 and 5A. Here, the primary key of the "Components" table is the C_SN column (the serial number of the component); this is also the external key of the "Products" table. Via the link between the two tables, it is possible to determine, for example, that the components whose C_SN values are "11", "13" and "14" form part of the product whose product serial number P_SN is "US1".

The pair of Products/Components tables is of the master/details type since:
  to a product there corresponds from zero to n components (the zero case would correspond to a product whose components have not yet been defined or are not yet present in the table of components), and
  to a component there corresponds one and only one product.

Such a join between two tables implies certain integrity constraints as to the values of the primary key and of the corresponding external key: to each value of the external key there must correspond one and only one value of the primary key.

The collection of joins for interrelating two tables is called a path. Certain database structures are such that several paths can exist between two of the tables which they contain. For example, two Clients and Suppliers tables can be related by a path passing through an Orders table or by a path passing through a Countries table. Conversely, there may be no path between two tables. For example, two "Production" and "Production_History" tables although having the same structure and containing data of the same flavor have no interrelationship (in the sense of the structure of the data).

The use of joins or relationships makes it possible to reduce information redundancies. In an ideally designed database, a particular pertinent information item is stored once only (except for the primary key/external key pairs required for the relationships). This offers a saving of space. Furthermore, updates are made easier. Thus (FIGS. 5 and 5A), modifying the name of the product (P_NAME) having a serial number P_SN equal to US1 involves modifying only a single row (in the Products table) although it consists of three components.

The data of a table are accessed via a form displayed on the screen. A form is composed of fields, each of which corresponds to a column of a table. It makes it possible to insert new rows into the table (create), to modify existing rows, to delete rows. A form which makes it possible to access several tables must then comply with the integrity constraints on the relevant structure.

A report (see example in FIG. 6) presents chosen columns of a table, for rows selected via a query (sometimes for the whole table). The result is displayed on the screen and/or printed. A report can interrogate and present the data from several tables, but it must then know the corresponding structure (external keys, primary keys and joins). In addition to reports, it is possible to define graphics displayed on the screen and/or printed.

The reports and the graphics are commonly referred to as status reports. The forms and the status reports are commonly referred to as programs. And the programs access the data via queries.

The status reports are accompanied by interrogation queries. Depending on the way in which the status report generating tools are designed, the interrogation query may be considered to be included within the status report and/or separate from the status report. Also known are insertion queries, update queries and deletion queries, which are in principle reserved for forms.

In this detailed description, the so-called SQL (Structured Query Language) query language will be used. The SQL language has formed the subject of several standardizations, the latest of which is the ANSI/ISO SQL-92 standard. The keywords of SQL commands are presumed to be understood by the reader. If necessary, they may be found in the aforementioned standard. Either quotation marks ("), or an apostrophe (') are used as delimiter for a character string. Appendix I of the description illustrates the other principal concepts needed to understand the present description, namely:
  in A-11, calculated columns,
  in A-12, restrictive conditions,
  in A-13, the general principle of a query (SQL's SELECT command).

The SQL language makes it possible to access relational databases whilst complying with an independence between the way in which the data are physically stored and the way in which these data are manipulated logically. Through its power, the SQL language makes it possible to express complex processing operations simply, including in particular nested loops (via joins): see Examples A-13-1 and A-13-2. However, recourse to the SQL language is in no way limiting, and the present invention can equally well be applied with the aid of a lower level language, which would drive the file system of the storage peripheral directly, for example.

In general, an application groups together a collection of programs geared around a given structure (tables and integrity constraints). A menu makes it possible to select, within an application, the program with which one wishes to work.

The development of applications geared around database engines has been automated to a greater or lesser extent by development tools. A development tool is an item of software which offers the programmer a library of program generators. These program generators allow an appreciable reduction in development times: when using a program generator, the programmer inputs parameters rather than writing the source code; these parameters are thereafter interpreted so as to produce a program in source code which the programmer can modify or augment manually, insofar as he masters the source code.

In principle, the development of applications geared around database engines adopts the following methodological approach: the programmer performs an analysis of the requirements. To do this, he can use a design method (Merise for example) whose ordered set of operational rules guides him in systematizing the thought process and in avoiding design errors. The analysis makes it possible to define a "data model" which expresses the semantics of the data in a pertinent manner. (A data model can be represented graphically by an Entity/Relation diagram.). The requirements analysis phase demands that the programmer has a good knowledge of relational algebra and of normalization of the structure of a database.

With an elementary development tool, the physical structure of the data must be implanted in the database using the "data model". After this, the development tool makes it possible to define forms and status reports geared around the structure (based on the internal dictionary) as well as menus. The user can then augment these forms, status reports and menus.

With a (more complex) advanced development tool, the structure of the data is input and stored in another dictionary, specific to the development tool. The data which have been input at this juncture, and those of the corresponding processing operations are referred to as "meta-data". This other dictionary, or "meta-dictionary" (510, FIG. 3), is distinct from the internal dictionary. It is geared around a system of independent files or around tables of the database itself (modify accessible, only via the development tool).

The meta-dictionary forms the subject of possible consistency checks by the development tool and may even build in certain operational rules of an analysis method (Tools of the CASE type). Using this meta-dictionary, the generator 505 (FIG. 3) of the development tool takes on board the following tasks:

the physical structure of the database is created, with the aid of the meta-dictionary (the internal dictionary is updated accordingly);

the programs and the menus (if any) are generated by the development tool;

the reports generator composes several interrogation queries (generally one per set of tables), and constructs a standard report for each query.

The user can then augment them.

Thus, the complexity of accessing the database is masked to the user to a greater or lesser extent, as a function of the quality (complexity level) of the development tool.

All this makes it possible to operate a database. Once operations have begun, it may be necessary to modify the data model and hence the data structure, and to do so for various reasons, for example:

the applicational requirement may have changed (change of trade for example), the initial requirement was ill-defined (inadequate specifications), or dealt with by a novice.

An ad hoc modification of the structure of the data (addition of a column to a table for example) is more or less well accepted by the development tools:

in the case of a "crude" tool, the user must modify the structure of the data manually, together with the queries in the relevant forms and status reports.

On the other hand, with a more complex, high-performance tool, it is sufficient to update the meta-dictionary of the development tool, this being automatically passed onto the physical structure of the data and onto the queries of the forms and status reports.

A more significant modification of the structure of the data (addition of tables, splitting of one table into several tables for example) is very unwieldy, if one desires to preserve the data already input. And the user will come up against several difficulties:

a) the new structure, even if it complies with the relational integrity, may perhaps no longer tally with the requirements of the application. The data may become unutilizable.

b) the syntax of the languages (procedural or otherwise) for accessing the data is complex and many modifications which are not taken into account by the development tool need to be made manually.

c) the modifications to be made to the queries of the forms and status reports are complex.

d) modification of the structure is itself tricky and complex if one desires to preserve the existing data (a very simple example: having an article number column, one wishes to alter the latter from numerical type to character type).

The generation by the development tool of a new version (based on the new structure) yields the starting versions of the forms, status reports and menus. Hence, all of the augmentation subsequently made to them is lost. In all cases, it is not easy, under the action of a development tool, to physically modify the data structure, and to modify the application so as to satisfy a requirement which was not envisaged originally.

The foregoing shows the importance of the problem posed. The invention, which proposes to solve this technical problem in an elegant and reliable manner, will now be described.

The invention makes it possible to start in all cases from a monotable structure. It thereafter allows the user himself to modify the structure of the data, once production has begun, as a function of his new requirements. Indeed, it does not necessitate any particular knowledge of the data access technique (SQL language for example), or of the principles governing relational data structures. It thus allows savings in analysis time, development time and subsequent modification time. It is suitable for all relational databases on the market, and also for other data management systems.

The invention provides an improved development tool or means which can also be regarded as a user environment interface.

This tool is based on a particular meta-dictionary 510 (FIG. 10), the minimum content of which (for the preferred embodiment) is given in A-21.

The meta-dictionary repeats certain information already contained in the internal dictionary, such as the name and the type of each column of each table. It contains much more of it. This meta-dictionary 510 is tended by a storage handler, which monitors every event relating to the conditions given in A-21. This monitoring can be limited to the moments at which the development tool is operating (insofar as it has exclusive rights with regard to the modifications of the said conditions). It can be wider. It is preferably continuous.

The invention is also based on a query builder 520 (FIG. 10). The queries built obey a well-defined general format, here dubbed the canonical form, the currently preferred version of which is indicated in A-22, whilst examples of canonical queries are given in A-23.

The manner in which the query builder works, in conjunction with the meta-dictionary, is illustrated in FIG. 12. In FIG. 11 will be found the meaning of the designs of blocks used in the flow charts.

After the begin 900, step 910 presents the user with various (available) possibilities for selecting columns, simple and calculated, as well as set functions. The expression set function is understood to mean a function pertaining to several rows, such as SUM( ), COUNT( ), AVERAGE( ), for example. At 911, the user can construct expressions using the columns and/or set functions. Thereafter, he can:

at 912, create and link restrictive conditions, at 913, define one or more (ordered) sorting criteria.

These steps 910 to 913 constitute the initialization of the query builder. They are described as carried out by the user. However, the query builder may equally well operate automatically, receiving this initialization on startup, in the form of parameters, which respectively define the elements input at 911, 912, 913. It is important to note that this query designer can store, in the form of character strings, the definition of the queries, the writing of which it has made possible.

Step 920 determines the set of tables to which the columns and expressions defined at 911 to 913 belong. This is performed selectively for each of the expressions involved in the canonical query A-22. If a column belongs to two tables, it is the primary key of one and an external key of the other. The query generator can associate this column with either of the two tables (the result of the query will be the same). The table where the column is primary key will preferably be taken.

Steps 921 to 925 and 929 determine the path connecting these tables (if there are several of them). Optionally, step 923 adds one or more tables so that such a path exists, starting from the meta-dictionary. It will be noted however that, whenever the implementation of the invention starts from a unique table, all the tables created thereafter are necessarily connected by one and only one path.

Hence, the first two rows of the query A-22 (and the third optional row, if the succeeding rows call columns whose tables do not appear in the second row) are constructed at 930 and 931.

In step 940, the "following" of the path (if there is one) and the satisfying of the restrictive conditions are dealt with in a similar manner. This serves in deciding (941) to write the WHERE clause, with a list of joins (943) and/or a list of restrictive conditions (949).

Thereafter, the GROUP BY clause is written at 961, if the test 960 so indicates: existence of set functions in the expressions and/or restrictive conditions.

The ORDER BY clause is written at 971, if the test 970 so indicates (the sorting criteria may comprise set functions).

The HAVING clause is written at 981, if the test 980 so indicates: existence of set functions in the restrictive conditions.

It will be observed that this query builder is itself responsible for all the checks. It suffices to give it, by input, or else by parameter passing, the selective list of expressions to be processed.

Using the definition of the form, as stored in the meta-dictionary, the invention also provides for the automatic (dynamic) creation of one or more forms.

This form is therefore suited to the structure of the data. It allows the consultation, insertion, modification and deletion of rows in the relevant table or tables. It complies with the integrity of the data by imposing the following constraints:

the value of a column must always tally with its type (for example, whatever is input into a date-type column must be a data item recognized as a date).

a primary key column must include only unique values.

an external key column must have a set of values included within the set of values of the corresponding primary key.

Again using the meta-dictionary, the invention makes provision for the automatic generation of reports and graphics, by the module 505.

A report is compiled on the basis of an interrogation query. It is possible in a report to define:

formats for presentation or "augmentation" (such as: bold, italics, large characters), group calculations performed on the data of the table (such as: totals, enumeration), breaks which condition the rezeroing of the group calculations. These breaks are organized as levels. The highest level termed level zero is that of the entire report. Level 1 corresponds to the first break (the most general) and the last level corresponds to the information of the break of last rank.

restrictive conditions or "filters", such as: product name (P_NAME)="COMP1", cost (COST)>1500.

certain sorting criteria.

According to one aspect of the invention, the breaks are proposed as a function of the structure of the application: consider a column $COL_2$ which belongs to a set of tables $\{TAB2_1 \ldots TAB2_p\}$, and the preceding column $COL_1$, which belongs to a set of tables $\{TAB1_1, \ldots TAB1_n\}$; these two columns are presented in the same break level, if, for every value of i, from 1 to n, and for every value of j, from 1 to p, the path for going from $TAB1_i$ to $TAB2_j$ does not comprise any join in the master/details sense. These breaks correspond to the breaking down of the structure into levels and therefore offer the user a default presentation which is expressive. The user can however modify them at will and define certain group calculations only for certain break levels and also insert or delete breaks.

FIG. 6 illustrates a report presenting the product name, the serial number of the component, the cost with:

as restrictive condition: the product name (P_NAME) must be different from "COMP1", a break with regard to the product name, a cost total (COST) for the components, a count of the number of components.

A graphic corresponds to an inquiry and to a graphical presentation of values of columns for certain rows. In general, a graphic is determined by parameters such as:

the type of presentation (histogram, pie chart etc.)

the format of presentation (color etc.)

one or more sorting criteria calculations (sum etc.)

According to another aspect of the invention, a graphic is compiled from an interrogation query comprising from zero to several columns of label type and one or more columns of numerical type. It comprises:

The format of the label type column.

The format of the graphic. Certain graphic formats accept only a specific number of columns of label type and of columns of numerical type. For example:

The pie chart supports only one column of label type and one column of numerical type.

The XY graphic (commonly referred to as a curve) does not support columns of label type and supports only two columns of numerical type (optionally three-dimensional graphics).

If in the interrogation query there are more columns of label type than supported by the format of the graphic, the module 505 generates as many exploded graphics as necessary, using a mechanism similar to that of breaks.

Example: consider an interrogation query which returns the turnover (equal to the sum of the amounts of the orders) by product and by region (the path between the Products and Regions tables comprises a join in the master/details sense). If the format of the graphic chosen is a pie chart, then a product/turnover pie chart will be generated for each region, and a product/turnover pie chart for all the regions together.

With the aid of the meta-dictionary, the invention makes it possible to ensure that the relation between the query and the status report (report or graphic) remains consistent after any reorganization.

The example of FIGS. 5 and 5A gives an already-tailored version of the structure of tables. In reality, if he seeks to develop a database for this same example, a novice will generally put everything into a single table. With the invention, the user can always commence with a single table, which hereinafter will be dubbed "Components_ and_Products" (FIG. 7). To do this, he simply defines the name and the type of the data which he wishes to input. The development tool has updated the meta-dictionary, created a monotable data structure in accordance with the name and the type of the columns indicated by the user, and created a default form allowing access to the table, and status reports.

Thus, the user can get going almost instantaneously, without having to think about the interactional structure between his data: he will, thereafter, input data via the form, and print status reports. FIG. 8 represents the form for inputting the information into the "Components_and_ Products" table. FIG. 9 represents the result of an interrogation query based on the monotable structure (with no filtering).

Even though it makes it possible to commence with a single table, the invention can also be applied to the case where an experienced developer will make initial choices for the structure of the tables which are guided by formal analysis thereof and practical considerations, as soon as these choices need to be reconsidered during the subsequent operations (with more and more data).

Indeed, it is noted that the data of a table having as few rows as that of FIG. 7 are already redundant. The informed observer will notice immediately dependencies between columns: CATEG depends on C_SN, P_SN, P_NAME.

However, at the data level, CATEG also seems to depend on C_ID and on C_DESC, in accordance with the aforesaid criteria; this is because:

the components SCR17, P166, HD1.2 and SCR15 are involved only in the manufacturing of products from the USER category, and the components SCR14, P200 and HD2 are involved only in the manufacturing of products from the SERVER category.

This dependency (which, because illogical, is false) is due to the fact that the data sample is too narrow to be representative. If a product from the USER category is for example manufactured with a hard disk referenced HD2, the dependency will disappear.

In general, the current structure of the database is no longer suitable when certain data are redundant within the table. Stated otherwise, the user is confronted with anomalies since the data model does not comply with or no longer complies with the various normal forms of the relational model.

In the case of FIG. 7, the user could be confronted with the following anomalies:

Deletion: the deleting of the single component of a product also deletes the information relating to the product.

Update: the updating of the information of a product (its name for example) must be carried out on all the rows of the table corresponding to its components. There are therefore as many modifications to be made as there are constituent components of the products.

Insertion: a product cannot be created without immediately assigning it at least one component.

Faced with the need to reorganize the structure of the database, the user would normally be compelled to operate by hand. For this purpose, the present invention provides him with means which may be broken down into three parts (FIG. 3):

i) the analysis of the data (530), ii) the selection by the user (570) of the columns of a table which will be isolated; during this phase, the user is superintended by consistency checks.

iii) the execution (580) of the reorganization of the data structure.

Phases ii) and especially iii) are optional. Indeed, it will be seen that it is also possible, as a variant, or as an adjunct, to implement the invention without physically reorganizing the database (590).

The aspect of the invention which is presently regarded as essential is the analysis. Here it is based on the meta-dictionary given in A-21 (510, FIG. 10), or on an equivalent means.

It is also based on a statistical tool (520, FIG. 10), which, in one embodiment, consists of a set of SQL queries given in Appendix III, and suited to various operations for systematic enumeration, as a function of the current structure of the database, such as it features in the meta-dictionary. These enumerations pertain for the most part only to "distinct values". The SQL queries interrogate the relevant table or tables directly.

The analysis phase comprises all or some of the operations which will now be described, with reference to Appendix III. It is driven by a module 530 (FIG. 10).

In general, the "current" columns denoted $C_i$ and $C_j$ in the description are denoted COL1 and COL2 in Appendix III, in accordance with the customary practice of persons skilled in the art.

The process firstly comprises an analysis (preferably exhaustive) of the repetitions of the values of the columns of the data tables. This analysis will be described with reference to FIG. 13 and to Appendix III.

Starting from the begin (1000), the tables of the database are determined, or better those used in the application (1010).

For each table, the analysis consists in determining:

at 1012, the number of rows, N.

In the SQL language, the number of rows of a table (step 1012) is obtained through query A-31-1, where TAB1 is the name of the relevant table.

at 1020, the names of the columns of the table,

This is obtained by reading the meta-dictionary (as a variant, the internal dictionary).

For each column $C_i$, the number of distinct values $N_i$, at 1024–1026.

The number of distinct values of a column of a table (step 1024) is obtained through the SQL query A-31-2, where COL1 is the name of the column.

then determining and running through the pairs of two different columns which can be formed for the table (1030)

This is obtained by reading the meta-dictionary (as a variant, the internal dictionary), in the form of a simple loop to be designed.

For each pair of columns ($C_i$, $C_j$), doing the operations (detailed below) making it possible to calculate:

their interdependency ratio.

the number of pairs of values which block the dependency.

For each group of columns of a table ($C_i$, $C_j$ ... $C_n$), any candidate keys (join or relationship) for the group.

We now return to the calculation of the dependency ratio of two columns of one and the same table. Let Ni and Nj be the respective number of distinct values of the two columns $C_i$ and $C_j$ (calculated at 1024–1026). At 1034, we obtain P, the number of distinct pairs of values of $C_i$ and Cj, through the query A-31-3, where COL1 and COL2 are the names of the columns $C_i$ and $C_j$, whilst:

"xyz" is a character string which does not exist in column COL1. It is best to take any character string which is a priori unlikely. The absence of the string "xyz" in COL1 can be verified through the zero response to the query A-31-4.

|| is the symbol for concatenating the values of two columns, as supported by the database engine.

Depending on the value P in relation to $N_i$ and $N_j$, the possible situations are:

case 1042, with P>Max($N_i$, $N_j$) there is no dependency between the two columns (1043). $C_i$ and $C_j$ are said to be independent. The number of pairs of values which block the dependency (case of near dependency) may then possibly be calculated.

cases 1046+1047, with P=$N_i$ and P>$N_j$ then $C_i$ determines $C_j$. Column $C_i$ is said to be the mother of $C_j$. Column $C_j$ is said to be the daughter of $C_i$.

cases 1046+1049, with P=$N_j$ and P>$N_i$, then $C_j$ determines $C_i$. Column $C_j$ is said to be mother of $C_i$. Column $C_i$ is said to be the daughter of $C_j$.

cases 1044+1045, with P=$N_i$ and P=$N_j$ the $C_i$ and $C_j$ are said to be equivalent from the point of view of dependencies, or interdependent. $C_i$ and $C_j$ are said to be sisters.

the case P<Min ($N_i$, $N_j$) is impossible.

Steps 1050 and 1052 respectively ensure looping around all the pairs of columns and all the tables until the End 1059.

The queries mentioned may be formulated with the aid of the SQL query builder already cited (A-22, and 520, FIG. 10). However, it will often be simpler to prepare them individually in advance, in the form of character strings, certain elements of which are variable. In the queries A-31, the variable elements are TAB1, COL1, "xyz" (or, what is equivalent 'xyz'), and COL2. In conjunction with the meta-dictionary, step 1024 (for example) of FIG. 13, will recompose the query A-31-2, by replacing the names COL1 and TAB1 therein by the name of the column and that of the table, respectively.

The writing of programs capable of implementing the loops described in FIG. 13 is regarded as accessible to the person skilled in the art on the basis of the present description, and of a procedural language such as the C language and its variants (C++ for example), or else SMALLTALK.

The case of "near dependence" is now examined with reference to FIG. 13A. This involves a pair of columns COL1, COL2 from one and the same table, for which each value of COL1 makes it possible to determine in a one-to-one manner the value of COL2 "to within a few exceptions". An example is given in A-24.

Generally, the number of pairs of values, B, which block the mother/daughter dependency between two columns $C_i$ and $C_j$ is obtained (step 1210, FIG. 13A) through the query A-32-1, where a and b are aliases defined in the table TAB1, and the other variables are defined as before. (a table alias makes it possible to access the table under a name other than its own; several aliases with regard to the same table make it possible to access the latter in two independent ways).

If B is small, it will be beneficial to force the dependency; the user will then have to normalize the two columns. Columns $C_i$ and $C_j$ are said to be the pseudo-mother and pseudo-daughter respectively. One also speaks of "pseudo-sisters" in the particular case where each of the two columns plays the role of pseudo-mother and of pseudo-daughter with respect to the other. This normalization of two columns in order to force the dependency will now be described.

It is firstly necessary to identify the pairs of values, which block the mother/daughter dependency between two columns $C_i$ and $C_j$. This is done in step 1230 (FIG. 13A), to which the query A-32-2 corresponds. This makes it possible to assess, for a value of the pseudo-mother column, the frequencies of the various values of the corresponding pseudo-daughter column.

The query A-32-2 comprises a nested SELECT command, which counts the number of occurrences (greater than 1) of the pair of values within the table. A search is made firstly for the values of COL1 which block the dependency. This involves the values of COL1 such that the number of distinct values of COL1| |'xyz'| |COL2 is greater than 1.

The query A-32-2 thereupon builds a main SELECT command which returns the value pairs found, given in FIG. 14, for the relevant example. For each element of the set of values of COL1 which block the dependency (according to the nested query), a search is now made for the corresponding values of COL2 and for their frequency. Likewise for the NULL value of COL1 (NULL is the case where nothing has been input).

It will be noted that it is possible to go directly to step 1230, without doing the preliminary count of step 1210.

The actual forcing (step 1250, FIG. 13A) is performed by the SQL command given in A-32-3, where:

TAB1 is the name of the table,

COL1 and COL2 are two columns of the table for which one seeks to force the dependency in the sense where COL1 will determine COL2, VALUE2 is the new value allocated to COL2, VALUE1 is the value of COL1 for the rows to be modified, VALUE2_1, VALUES2_2, ... VALUES2_n are the values of COL2 for the rows to be modified.

However, in the case of values not input into COL1, the forcing is performed by the SQL command given in A-32-4.

The forcing can also comprise the SQL command given in A-32-5, where:

TAB1 is the name of the table,

COL1 and COL2 are two columns of the table for which one seeks to force the dependency in the sense where COL1 will determine COL2, VALUE1B is the new value allocated to COL1, VALUE1 is the value of COL1 for the rows to be modified, VALUE2_1, VALUES2_2, . . . VALUES2_n are the values of COL2 for the rows to be modified.

We now return to the monotable structure, but according to FIG. 7A (with slightly different content, for illustration). The dependency relation between the product number and the product name may be severed (error of input for example). The result of the query making it possible to determine the pairs which block the dependency could be (FIG. 14), expressed plainly:

"There are two components for the COMP1-USER COMPUTER product and one component for the COMP1-USER COMPUTER BIS product; one and the same product number has been used for two different products."

To force the dependency, it is necessary by choice to:

Allocate another product number to one of the two (A-32-5). In this case the analysis of the frequencies indicates that it is more probably the USER COMPUTER BIS row which does not have the right product number.

Replace "USER COMPUTER BIS" by "USER COMPUTER" (A-32-3).

In addition, a product number must be input for the product with serial number SRV1 (A-32-4).

Any candidate keys for a group of columns must comply with the constraint: Each candidate key must be, with regard to all the other columns of the group, either mother, or sister. In order for a column to become candidate key of a group of columns, it is necessary to force the dependency with all the pseudo-daughters of the group (in the case of near dependency).

Preferably, the result of the analysis is expressed and stored in the form of a group of columns, comprising:

the subgroup of the candidate keys, and the subgroups of their daughter-columns, ranked by level of kinship (daughters of daughters, and so on and so forth), in a tree-like manner.

The consistency checks are made in accordance with the principles governing relational structures; they depend above all on the result of the analysis of the data already input, kinship levels in particular. They guarantee the user against unutilizable data and spare him from the need for any knowledge and understanding of access to the data, and of the principles governing data structures (relational for example).

The result of the analysis makes it possible to:

suggest which columns will be able to be isolated from a table, determine any candidate keys of a group of columns, make it possible to benefit from an assisted mode of input using the dependencies (possibly a virtual one).

One of the implementations of the invention therefore consists in physically reorganizing the structure of the tables. Elementarily, this function of reorganizing the structure consists in splitting a table up into two tables, which will be in a master/details relation.

Although it is possible to proceed otherwise, it is nowadays deemed preferable to leave the user to choose from among the various possibilities which may emanate from the analysis. Such a choice will pertain on each occasion to a table (TAB1), and to a group of columns S1, S2 . . . Sn of this table (which will form the new table, whereas R1, R2 . . . Rp denote the columns which will remain in the table TAB1), while complying with the following constraints:

the selected group of columns S1, S2 . . . Sn must not include the primary key of the table (the starting one), the dependencies between the selected columns make it possible to determine the candidate keys; the user may possibly select one of them.

This phase is performed for example with the aid of a user interface having windows, like the one of FIG. 15, with a window 91 for selecting tables (here one only), then a window 95 for selecting the columns to be isolated from the chosen table, then selection at 96 of a candidate key for the new table (as an option). The name of this new table, which will be denoted TAB2 hereinafter, is input at 92. The selection/reorganization phases are illustrated in the form of steps in FIG. 16, in the case of an interaction with the user, with the screen of FIG. 15.

Starting from the begin 2000, step 2010 uses the meta-dictionary to ascertain the list of tables used by the application, which list is displayed at 2012. At 2014 the user chooses the table TAB1 to be reorganized. Using the meta-dictionary, at 2020 the system delivers the list of columns of TAB1. At 2022, these columns are displayed, with the exception of the primary key of TAB1, and at 2030 the user chooses the columns Sj to be isolated.

These choices are made via a loop around steps 2032 to 2036. With each selection of a column, one determines whether this column can serve as candidate key (2034), by storing this information item.

Thereafter, we go to the actual reorganization, which is slightly different, depending on whether the user has, or has not, chosen a candidate key. It is supposed that the forms defined at the outset drove all the fields of the single table from which one started.

i) If, in steps 2042 to 2046, the user has selected a candidate key, which is assumed to be (S1), the actual reorganization is performed by steps 2048, 2049 and 2060, in accordance with the SQL commands A-33;

The master table is created by executing the command A-33-1. This SQL command creates a table named TAB2, with the result of a SELECT command, nested within the CREATE command.

The original table TAB1 is modified by stringing together the 3 commands given in A-33-2. A temporary table TEMPO is created with the non-transferred columns, plus the chosen primary key S1 (TEMPO is a name available at database level: there is no other table or view having this name). Thereafter, TAB1 is erased and TEMPO is renamed as TAB1.

ii) otherwise, in the second case, where the user has not selected a candidate key (and there is perhaps no candidate key for the group of selected columns), the actual reorganization is performed by steps 2056, 2058 and 2060, in accordance with commands A-34.

It is then necessary to introduce or create a column which will be the primary key in the master table.

The creation of the details table follows the stringing together of steps A-34-1, where CODE_TAB2 is the name of the primary key of table TAB2. CODE_TAB2 and TEMPO are names which must be available at database level. The first row is very similar to the query A-33-1, except that instead of creating the table TAB2 directly, a TEMPO view is involved. It is the second row which creates TAB2, by adding to the TEMPO view a calculated column CODE_TAB2, the value of which is ROWNUM, that is to say the rank of the row in the table, after which TEMPO is erased.

The tailoring of the original table TAB1 is performed as indicated in A-34-2.

Since for the moment the primary key exists only in TAB2, it is necessary to start from a join between TAB1 (old) and TAB2, which has just been created. Hence, the more elaborate first CREATE command.

By stringing together the 3 commands given in A-34-2, a temporary table TEMPO is created with the non-transferred columns, plus the chosen primary key S1 (TEMPO is a name available at database level: there is no other table or view having this name). Thereafter, TAB1 is erased and TEMPO is renamed as TAB1.

In both cases, the meta-dictionary is updated (step 2065):

a) the new master table TAB2 formed of the columns S1, S2, . . . Sn is taken into account.
b) in the case of the creation of a primary key for TAB2, the creation of the column CODE_TAB2 in TAB1 is noted; the creation of the column CODE_TAB2 in TAB2 is noted. The forms which make it possible to drive the table TAB1 are augmented by the column CODE_TAB2, and no longer make it possible to drive (input) the columns S1, S2, . . . Sn.
c) in the case where the column $S_i$ has been chosen as primary key of the table TAB2, the forms which make it possible to drive the table TAB1 no longer make it possible to drive the columns S1, S2, . . . Sn, except $S_i$ which remains driven (but which must comply with the integrity constraints due to its new role.
d) the primary key of TAB2 is referenced as such.
e) the external key of TAB1 is referenced as such.
f) the information from the master/details relationship between the tables is inserted. Furthermore, it may be necessary to update the pre-existing joins relating to columns of the newly created table.

The process which has just been described in an elementary manner makes it possible to guarantee that the data meta-dictionary remains consistent and synchronized with the physical structure of the data; thus, dynamic generation of the forms, interrogation queries and status reports is ensured without user intervention, and these are automatically adapted to the new structure, as will be seen hereinafter.

The user can then continue his work on the basis of the new structure.

Beside this, it is known practice to endow a field of a form with properties such as: "input", "modification permitted", "modification prohibited", or else "modifiable only if", with a condition which can in particular be a restriction relating to certain constraints, or even the action of the user on a defined keyboard button, or on an icon defined with the mouse. In a development tool, this can be done at the level of the form generator part, working for example with a form definition file.

Starting from the moment at which, according to the invention, the single table has been partitioned so as to define a separate master table, the form which drove this single table will be modified, or replaced by a new form, whilst complying with the following rule: as soon as a form comprises fields belonging to a master table and fields belonging to a details table, only the fields belonging to the details table can be modified; and the values taken by the external key column must belong to the set of values taken by the primary key of the master table. A separate form is generated to drive the master table.

Thus, FIG. 18 represents the form for inputting the components used in production after the reorganizing of the information relating to the products. It is noted that the fields P_NAME, P_ID and CATEG are no longer directly accessible since they do not belong to the Components table whereas they did belong to the Components_and_Products table; they are determined by the value of the product serial number field (P_SN) which is the external key of the Components table which is related to the primary key of the Products table.

To obtain this form from the previous one, all the fields (columns) which have been transferred to the master table are altered to "non-modifiable", except for the external key. Specifically, a handler can be used which will:

fetch the list of columns of the group which served in defining the master table (gleaned from the memory 550, or from the meta-dictionary 510, in the update which stems therefrom);

pull out the relationship key from this list, search for each column name for this list in the definition of the form, so as to accompany the relevant field with the "non-modifiable" property, and accompany the field relating to the relationship key with a "modifiable if and only if the new value exists in the master table" property. The list of existing values is given by the search query A-37 for searching in the master table TAB2, of which COL1 is the primary key (the DISTINCT keyword is optional).

As a variant, or as an adjunct, FIG. 18A represents a simplified form for inputting the components used. The fields P_ID and CATEG which were filled in automatically in the form of FIG. 18 have been deleted from the form. Only the Product name field (P_NAME) has been preserved so as to check whether the product serial number input is indeed the one desired. Specifically, the process is the same as above, except that instead of accompanying the fields with the "non-modifiable" property, they are quite simply deleted from the definition of the relevant form.

At A-23 will be found a few examples of queries written for the structure reorganized into two tables (Components and Products).

FIG. 19 represents the result of the interrogation query after the reorganizing of the information relating to the Products. A break (this being a way of illustrating the new structure) has been provided automatically by the report generator, in response to the presence of a new table. Just as with the forms, such a break can be simply determined by the "Break" property associated with the relevant column, in the definition of the relevant report. Illustrations other than a break can be envisaged.

In practice, the selection/reorganization cycle (or else the analysis/selection/reorganization cycle) can be repeated as many times as necessary, at the very east so long as there is still a group of related columns to be processed.

In the example considered, it is thereafter possible to proceed with a new reorganization of the information relating to the category. FIG. 17 represents the join relations of the structure with the three tables Components, Products and Categories. FIG. 19A represents the result of the interrogation query on these three tables. A second break has been performed automatically.

In the embodiment described above, the physical reorganizing of the tables has the following effect:

in data input mode (form), input access (modify, create, delete) is restricted to some only of the columns of a group of related columns, the others being simply read accessible, or inaccessible;

to write access these other columns, a different form must be used, processing the new table created.

This other form can be rendered accessible from the first, in particular under the following conditions:

should an external key which does not exist in the master table be input, when the user wishes to modify the record of the master table which corresponds to the value of the external key, actuating for example a keyboard function button.

However, it would be possible to envisage, after physically reorganizing the tables, different solutions for tailoring the forms, in particular if it is supposed (doing away with the aforesaid rule) that, in a form which comprises fields belonging to a master table and fields belonging to a details table, it is possible to modify fields belonging to the details table and fields belonging to the master table.

According to an interesting variant, instead of physically restructuring the tables, the analysis performed may serve only to modify the manner of operation of the input forms, behaving as if the database structure had been reorganized ("virtual reorganization" of the database). Since the group or groups of related columns are not reflected by a modification of the structure of the tables in the meta-dictionary, the forms are then tailored on the basis of the memory of dependencies (and of keys) 550.

The tailoring takes account of the levels of kinship between the related columns of each group. The starting point is a relationship key which is one of the candidate keys and is selected by the user or chosen automatically.

In a development tool (form generating part, working for example with a form definition file), it is also known practice to endow a field of a form with a "value if empty" property, accompanied by an expression, or by a function, the result of which will be taken as the value of the field if it is empty (a little like a "default value"). Likewise, the "the value has been modified by the user" property is also known.

A request which searches, in the same table, for at least one pre-existing row having the same value for the relationship key will then be taken as expression. This query may be based on the query builder, or else be rebuilt each time, on a base prepared in advance piecewise, and stored.

In this virtual reorganization mode, a form can work as follows:

During the inputting into the field of the relationship key, the empty fields dependent on this key (sisters and daughters) are automatically filled in by default.

Thus, in the form of FIG. 8 (monotable structure), the inputting of "US1" as product serial number (P_SN) causes the automatic inputting of the Product reference field (P_ID) which is a sister column and of the Product name field (P_NAME) and category field (CATEG) which are daughter columns.

The field P_ID (COL2) is filled in automatically by the result of the query A-36 searching for "US1" in the column P_SN (COL1) of the already existing rows. The DISTINCT keyword is optional in the query A-36, as soon as any row found contains the sought-after result for COL2 (P_ID).

The user can at leisure overwrite the values filled in by default. He can thus sever the dependency between two columns and the operation of the virtual reorganization mode is then interrupted for this pair of columns.

For example in the monotable structure, there is a dependency between the Cost column (COST) and category column (CATEG): the inputting of a cost automatically fills in the category field. If the user changes the (automatic) value of the Category field, the dependency between Cost and Category is severed: the inputting of the Cost field will no longer automatically fill in the Category field. The memory of dependencies 550 is updated accordingly, and the operation of the form is modified.

This is as it were a dynamic coupling between the analysis and the input forms. Whereas the structure of the tables is not modified, the data relating to the operation of the input form or forms remain, on the other hand, physically modified in a manner which simulates the restructuring of the tables.

This can be performed systematically, according to the steps of FIG. 20. On validating 2200 a field, and if the latter has been input manually (2210), the value input is placed in a memory area of the list type, or container, in step 2220. So long as this container contains at least one element (2230), its first element (which disappears from the container) is extracted at 2240 so as at 2250 to determine its dependent columns (direct daughters and sisters of the field considered at 2200). The fields relating to the sister columns are filled in automatically, if they are empty, at 2260. In step 2270, the same is done for the direct daughter columns, which will moreover be placed in the container. (A is the direct daughter of B if there exists no column C, other than A and B, such that B is the mother of C and C is the mother of A). And we then return to 2230. The process terminates at 2290 when the container is empty. This makes it possible to process the sisters of the field targeted at 2200, as well as to run through the complete tree of its daughters, granddaughters (and their sisters), and so on and so forth.

In data input mode (form), it will be possible to compel (by default or firmly) the data present in related columns of a row to remain consistent with at least partially identical data already existing in other rows, with the aid of a query of the same type as above. The default compulsion is aimed at simplifying input by suggesting values dependent on values already input. Firm compulsion corresponds to the case where one wishes to lock the dependency or the interdependency between the columns of a group.

The analysis can be rendered dynamic, with updating in real time or near real time, in the following way:

in the case of a created row, the query A-32-1, performed for all the pairs of columns, can be employed to determine whether anything has changed in the groups of related columns. If so, the analysis is redone. As a variant, one can also decide directly to always redo the analysis on a create row. In practice, this analysis will be simplifiable, since there is only one new row to be compared with all the others.

in the case of a deleted row, it is sufficient to search for whether its disappearance re-establishes the dependency.

lastly, a modify is equivalent to a delete followed by a create.

In practice, the foregoing will be simplifiable, since there is only one new row to be compared with all the others.

Before the analysis phase, it may be useful to carry out a prior step of prenormalizing the data of each column, or of certain at least of the columns (in particular of character type). This is because the user may have input two different values having identical semantics (for example the cities 'Paris' and 'PARIS' are semantically identical although different from the point of view of their character string).

The present invention profoundly modifies the customary development cycle: the functional dependencies are deduced from the dependencies between the data. This minimizes the analysis phase. This also makes it possible to highlight dependencies which are not envisaged or not present originally. The present invention may therefore also be used as a tool for searching for correlations between the data and as a tool for dividing the data into domains.

The invention thus proposes a means making it possible in particular to reorganize a database, after a certain operating time. This means can be implemented on the initiative of the user alone. It can be proposed at regular intervals, over time, or else as a function of the growth of the database. Before such a proposal, or else in a general way, the analysis part can be implemented automatically, at least partially, so as to determine whether there is actually anything to do.

It would also be conceivable for this analysis part to be kept up to date in the background. More generally, the analysis means and its storage means then operate continuously, dynamically (rather than from time to time, on the user's request, or on prompting by the development tool). Thus, the station (or one of them) can be furnished with a handler (or "trigger"), which triggers the updating of the analysis as soon as an event occurs which may influence this analysis. To do this, it may be necessary to continuously track (directly or indirectly) all the variables processed during the analysis phase.

It will be noted that, even if it indicates that a physical reorganization is desirable, the analysis phase is not necessarily followed by such a reorganization. The user can in fact refuse the reorganization for various reasons, such as the time which it will take, or the fact that he is not convinced of the utility of dividing his table into two parts, for example.

The present invention applies in general to any type of data, any type of relation between the data, any type of database (not necessarily relational), any type of database access language, any type of database architecture, any type of operating system, any type of storage medium and of storage system.

The invention therefore to extend [sic] its effects to any file management system accessible via a programming language which would make it possible to write the detailed equivalent of the SQL commands mentioned in the description. The power of the SQL query builder described implies that the latter can generate (in particular) all the requisite statistical queries. With other languages, it may be necessary to create a module (procedure) for each of these statistical queries. In suchlike cases, the structure of FIG. 10 may be modified: the statistical tool 520 would receive only data to be processed, whilst the interrogation of the tables so as to access the columns would be done directly by the analysis module 530.

From another standpoint, with the statistical tool described, each statistical operation is conducted on all the rows, for one or two chosen columns. A variant of the SELECT COUNTs of Appendices A-31 (possibly A-32) would consist in running through the values of the relevant column, while performing a detect new value: if the value has already been encountered, we go to the next; otherwise, this value is referenced as being one of the values taken by the column, a counter is incremented and we go to the next value. At the end, the value of the counter gives the number of distinct occurrences taken by the column. For COL1| |"xyz"| |COL2 we do the same thing by considering the concatenation of COL1, "xyz" and COL2 as a simple column (by considering as before that "xyz" is chosen so as not to create any possible confusion). By processing this in a procedure, it would be conceivable to simultaneously process several variables in a row (for example, to consider COL1, COL2 and their concatenations such as COL1| |"xyz"| |COL2), then to subsequently sweep through all the rows, processing these variables selectively. All the variables (of the kind COL1, COL2 and COL1| |"xyz" COL2) which can be defined from all the columns of the table can even be processed in one go.

According to another interesting variant, it is possible to use ranked sets or "lists", in each of which, for each value of a data item of a column, the rows (designated for example by a number) which use this value are cataloged.

This will be described with reference to two columns denoted COL1 and COL2 (Appendix A-25). For each value of each column, the rows which use this value are determined. The sets obtained for the two columns are compared:

if they are strictly identical, the two columns are sisters.

if each set for a first column is equal to the a [sic] set for the second column, or else to the union of several sets for the second column, then the first column is the daughter of the second.

if there is no combination of sets for a column such that their union gives a set identical to one of the sets for the other column, the columns are independent.

In Appendix A-25-1, it is observed that

E21=11 U E13 and that E22=E12 hence COL2 is the daughter of COL1.

In the example of Appendix A-25-2 (one row added), it will be observed that there is no combination of E11, E12 and E13 whose union is E21; COL2 is therefore not the daughter of COL1. Likewise, there is no combination of E21 and E22 whose union is E12; hence COL1 is not the daughter of COL2. COL1 and COL2 are consequently independent.

An operation of comparing the unions and/or intersections of ranked lists (of a predefined format) is accessible to the person skilled in the art. On that basis, the construction of a handler performing the above functions for carrying out the analysis is likewise accessible. This handler is more efficient than the aforesaid SELECT commands, at least for certain applications.

Likewise, storage in row form is not obligatory. It is for example possible to imagine, for each column, that a value be stored just once physically and that the list of row numbers ("indices") where this value appears be stored in parallel (or equivalent storage). A row is then reconstructed dynamically by retrieving the various values of the columns of this row by searching for the row number in the lists assigned to each column.

Let the table consist of three columns COL1, COL2 and COL3 illustrated in A-26-1. For this table, the index sets (row numbers) can be constructed for each value, as indicated in A-26-2. The set of row numbers for rows with the value "X" will now be denoted X.

Relations A-26-3 show that COL1 determines COL2. In the same way, we deduce that COL2 determines COL3 and that COL1 determines COL3 (if only by transitivity).

But COL2 does not determine COL1 since

A∩a≠a.

It is desired to reorganize this table so as to culminate in the following structure:

TAB1 (COL1, COL2)

TAB2 (COL2, COL3)

COL2 will become an external key of TAB1 and the primary key of TAB2.

To reorganize, another series of index sets is defined for the primary key of the new table (COL2) and the index sets of the other columns of the new table are updated. The new structure is therefore that given in A-26-4, where the row numbers in the table TAB2 are distinguished by "bis".

The join is made by establishing the correspondence between the two index sets for the pivot column (which is an external key of one table and the external key of the other table). For example, if one seeks the value of COL3 corresponding to COL1="C", the pathway is as follows:

value C for COL1⇒ index 4 of TAB1⇒ value b for COL2⇒index 2bis of TAB2⇒ value α for COL3.

Likewise, if one seeks to ascertain the values of COL1 for COL3=a, the pathway is as follows:

value α for COL3⇒ index 1bis and 2bis of TAB2⇒ values a and b for COL2⇒ indices 1, 2, 3 and 4 of TAB1⇒ values A, B, C for COL3.

We now return to the starting table to show the manner of operation of the tracking of a dependency during the input/modification/deletion of a row. By adding a row, the table becomes that illustrated in A-27-1. The membership index sets for each value become those given in A-27-2.

To check that the dependency relation between COL1 and COL2 has not been severed, it suffices to check that the set of indices corresponding to the newly input value of COL1 is always included (in the wide sense) in the set of indices corresponding to the newly input value of COL2:

It is therefore necessary to check whether $\{1,2,6\} \subset \{5,6\} = \{1,2,6\}$.

This is not the case, hence the dependency has been severed.

The indices of the rows which block the dependency are obtained easily by considering the empty intersections of the index sets which are neither empty nor equal to the set of indices of the near-daughter column.

Thus, Appendix A-27-3 shows that the dependency is blocked by the following set of two index sets: $\{\{1,2\},\{6\}\}$.

When deleting a row, the dependency is re-established only if the set of sets of indices which blocks the dependency does not contain an element.

Thus, deleting row 1 gives $\{\{2\},\{6\}\}$. There is more than one set, the dependency is therefore not re-established. However, deleting row 2 gives $\{\{6\}\}$. The dependency is re-established.

As already indicated, the modifying of a row can be treated for example as the stringing together of a delete and a create in any order.

Being geared around hardware means which carry out operations, the invention could also be expressed in process form. It also culminates in a markedly improved development tool.

The simplest version of this development tool comprises the means making it possible to carry out the following functions:
  create an application with monotable structure.
  create input forms as a function of the current structure.
  generate interrogation queries and status reports adapted to the current structure.
To which is added, according to the invention:
  as an option, the prenormalizing of the data (analysis).
  the analysis of redundancies and interdependencies of the data (analysis), and
  the physical reorganizing of the structure of the data as a function of the result of the analysis as well as the forms, status reports and reports (reorganization), or else the "virtual" reorganization described earlier.

In a more advanced version, the said tool will comprise the means making it possible to carry out the following operations, in order to fetch (import) an already existing file:
  create a monotable structure making it possible to fetch the data of a file in tabular format.
  determine for the file the column delimiter:
    In each row, the number of occurrences of each character is counted. The delimiter belongs to the set of characters having the same, nonzero, frequency in each row of the file. If the set is empty, the file is not acceptable. If the set comprises more than one element, a choice of delimiter is requested of the user. Once the delimiter has been determined, possibly after having accepted signals from the user via the user interface, each row is divided into an identical number of columns.
  determine the format of each column of the file:
    For simplicity, it is supposed that the data can only be in numerical, alphanumeric or date format: in order for a column to be in numerical format, all the values of this column must be in numerical format. In order for a column to be in date format, all the values of this column must be in date format. If this is not the case, the column is in alphanumeric format. For the numerical format, the width and the precision of the column are determined: the width is equal to the sum of the maximum number of digits coming before the decimal separator and of the maximum number of digits coming after the decimal separator. The precision is equal to the maximum number of digits coming after the decimal separator. For the alphanumeric format, the width of the column is determined. The width is equal to the maximum number of characters of the column.
  create a table in the previously determined formats.
    The SQL command is of the form given in A-35, where TAB1 is the name of the table to be created, COL1 . . . COLn the name of the columns of the table and FORMAT1 . . . FORMATn the corresponding formats; FORMATi has one of the following forms:
      VARCHAR2 (L) for the alphanumeric format where L is the width of the column. Certain databases do not support the VARCHAR2 format of the SQL92 standard, so the CHAR format is then used.
      NUMBER(L, P) for the numerical format where L is the width of the column and P its precision.
      DATE for the date format.

The tool can also comprise the means making it possible to carry out the following operations:
  create forms making it possible to access the data contained in the tables, with the validation of the insertion, of the deletion or of the modification of a row being possible only if the following constraints are complied with:
    The value of a column must always tally with its format.
    A primary key column must comprise unique values only.
    An external key column must have a set of values included within the set of values of the corresponding primary key.

It may also comprise the means making it possible to create interrogation queries where the user specifies simply the ordered list of simple columns or of calculated columns, the list of restrictive conditions and the list of sorting commands.

This corresponds to the query builder, which it will be noted exhibits intrinsic interest, independently of the use which is made of it here. This observation applies to other elements of the present invention.

In addition, the development tool advantageously comprises means for generating status reports, with:
  a report generator for presenting the result of the interrogation queries, where the user specifies simply the interrogation query, the definition of breaks, any group calculations, the format of presentations of the columns and of any group calculations, and/or a graphics generator for presenting the result of the interrogation queries where the user specifies simply the interrogation query comprising from zero to several columns of label type and one or more columns of numerical type, the format of the column of label type (possibly), the format of the graphics.

In the foregoing, a development tool has been defined which is intended to work with a pre-existing database management system. An interesting variant, in particular with the management lists (Appendices A-25 et seq., and their description), consists of an integrated system which comprises the management of tables and the analysis and/or reorganization tools described.

In all the embodiments described or envisaged, it is possible to replace or supplement the physical reorganization of the tables with the virtually reorganized database structure mode, for input into forms.

Instead of operating exhaustively, the analysis module could stop as a function of chosen criteria, including the fact that it has already found a group of related columns (with no false dependencies). It would also be possible to string together directly with regard to the restructuring, without selection by the user, as soon as the analysis gives a group of related columns. The relationship key could then be chosen, from among the candidate keys, as:

the shortest column of this group, or a numerical column, or a new key could be created systematically.

With appropriate precautions, it would also be possible to automate the forcing of dependency, at least in flagrant cases, or else to make a corresponding default proposal to the user.

Lastly, although it is currently preferred that the processing and storage of the data be close together, it is possible to envisage remote storage, for example in the manner of network computers.

APPENDIX I

A-11—Calculated Columns

A calculated column is a formula consisting:

of simple columns or of calculated columns.

of operators and of mathematical functions.

of set operators (sum, average, count for example).

Examples

PRICE_ET*1.206 where * is the multiplication symbol and PRICE_ET a column of a table corresponding to a price excluding tax.

PRICE_ET*VAT_RATE where VAT_RATE is a column of a table corresponding to a VAT rate.

Count(NO_INVOICE) where count( ) is an enumeration operator, and NO_INVOICE is the primary key column of a table comprising data relating to invoices.

Sum(UNIT_PRICE*QUANTITY_ORDERED) where Sum( ) is a summation operator, UNIT_PRICE is the unit price column of a table of articles and QUANTITY_ORDERED, the quantity ordered column of a table of orders.

A-12—Restrictive Conditions

A restrictive condition is composed:

of a simple column or of a calculated column.

of a comparison operator.

possibly, of a value or of a set of comparison values.

Examples

CITY="Paris" The column corresponding to a city must be equal to the value "Paris".

CITY from among("Paris", "London", "Washington") where among( ) is a membership operator

PRICE_ET*VAT_RATE<1000

Count(INVOICE)>3.

A-13—Queries—principle

For its part, an interrogation query consists of:

an ordered list of simple columns or of calculated columns.

a list of restrictive conditions.

a list of sorting commands.

The list of simple and calculated columns satisfies the following constraints: it does not contain any external key either directly (case of a simple column) or indirectly (in the definition of a calculated column).

The restrictive conditions are related by the 'AND' and 'OR' Boolean operators, as well as possibly the negation operator denoted 'NOT'.

Examples

The two examples below are based on two tables "STUDENTS" (n rows) and "UNIVERSITIES" (p rows). They are related by a join with regard to an identifier of the relevant university concerned, UNIVERSITYCODE, which is external key in "STUDENTS" and primary key in "UNIVERSITIES".

A-13-1

SELECT * FROM STUDENTS, UNIVERSITIES returns a Cartesian product of the two tables (n times p rows), which can be regarded as a new table reviewing all the universities for each student.

A-13-2

SELECT * FROM STUDENTS, UNIVERSITIES WHERE STUDENTS.UNIVERSITYCODE= UNIVERSITY.UNIVERSITY CODE returns n rows only (1 per student). The SQL engine has created a loop in order to arrive at this result: we loop around the STUDENTS table and for each student we search for the information of his/her university by virtue of the UNIVERSITYCODE.

APPENDIX II

A-21—Meta-dictionary

The meta-dictionary (of the development tool), which is stored in the database, contains, as a minimum:

the information relating to the data structure:

the names of the tables.

the names of the columns of each table.

the type of each column (character, numerical, date for example).

for each table, the indication of the column which is the primary key.

for each table, the columns which are external keys (possibly none).

the relationships between the tables together with their cardinality relationship (sense of the master/detail relationship).

the definitions of the forms:

the reference of the table (or of the tables) to be modified by virtue of the form.

the references of the columns belonging to other tables related to the table.

the definitions of the reports:

the reference of the columns included in the report.

any calculations to be performed on these columns.

the restrictive conditions on certain columns.

the display formats of each column.

other parameters (sort commands, breaks, title of the report, etc.).

the definitions of the graphics:
  the reference of the columns included in the graphic.
  any calculations to be performed on these columns.
  the restrictive conditions on certain columns.
  the type of graphic (histogram for example).
  other parameters (title of the graphic, etc.)
A-22—Query: Canonical Form
It is:

|  | (Row No.) |
|---|---|
| SELECT $Col_1$, $Col_2$, ... $Col_n$ | (1) |
| FROM $TAB_1$, $TAB_2$, ... $TAB_p$ | (2) |
| $TAB2_1$, $TAB2_2$, ... $TAB2_q$ | (3) |
| WHERE $COL_a$ = $COL_b$ AND $COL_c$ = $COL_d$ ..., AND $COL_r$ = $COL_s$ | (4) |
| AND COND_NOT_$ENS_1$ AND COND_NOT_$ENS_2$ ... COND_NOT_$ENS_t$ | (5) |
| GROUP BY COL_NOT_$ENS_1$, ... COL_NOT_$ENS_u$ | (6) |
| HAVING COND_$ENS_1$, ... COND_$ENS_v$ | (7) |
| ORDER BY $ORD_1$, ... $ORD_w$. | (8) |

This SQL SELECT command is decomposed over several lines (here, apart from exceptions which are mentioned or obvious, indented lines form in principle part of the same SQL command as the previous line).

The first line of the query indicates as "$Col_1$, $Col_2$, ... $Col_n$" the list of columns (simple or calculated) which will be extracted by the query.

The second line determines as $\{TAB_1, TAB_2, ... TAB_p\}$ the set of tables to which the simple columns and the components of the calculated columns belong, firstly for the list of columns, but also for the rest of the SQL command, essentially the restrictive conditions.

It should be observed that we are dealing with a set: a table appears therein once only even though several columns of this table form part of the list of columns (for example)

In the third line come the restrictive conditions whose columns (simple or calculated) do not comprise, directly or indirectly, any set functions (sum, average, etc.); these conditions $COND_i$ are of the form:

$COL_i$ $OP_i$ $VAL_i$ where $COL_i$ is a column (simple or calculated),
  $OP_i$ is an SQL language operator (for example = equality, != difference, < less than, IN among, IS NULL is not filled in).
  $VAL_i$ a value, a set of values or nothing according to the choice of the operator $OP_i$.

The conditions are related by the Boolean operators.

They can be bracketed by parentheses so as to resolve any ambiguity regarding the priority of the operators: for example $COND_1$ AND ($COND_2$ OR—$COND_3$). By virtue of knowing the structure of the tables, the joins between the tables are constructed: $COL_a$=$COL_b$ where $COL_a$ is the primary key of one table and $COL_b$ the corresponding external key of another table, so that the set of joins constitutes the minimum but complete path passing through all the tables of the set $\{TAB_1, TAB_2, ... TAB_p\}$. Other tables $\{TAB2_1, TAB2_2, ... TAB2_q\}$ than those belonging to $\{TAB_1, TAB_2, ... TAB_p\}$ may be involved in building the path. Several columns of the same table may be involved in the joins constituting the path. Such a path always exists.

The fourth line of the query relates to the restrictive conditions for the columns (simple or calculated) which do not contain, directly or indirectly, any set function; it is of the form:

COND_NOT_$ENS_1$ AND COND_NOT_$ENS_2$ ... COND_NOT_$ENS_t$

The third and fourth lines (if one at least exists) are preceded by the keyword 'WHERE' and are related, if the two exist, by the keyword 'AND'.

The fifth line of the query relates to the columns (simple or calculated) which do not contain, directly or indirectly, any set function; let COL_NOT_$ENS_1$, ... COL_NOT_$ENS_u$ be these columns.

Thereafter, in the sixth line come the restrictive conditions on the calculated columns which all contain at least one set function and are denoted $COL_{ENSi}$.

Lastly, in the seventh line come the sort commands denoted $ORD_i$. A sort command comprises a column (simple or calculated) and a direction ASC (ascending) or DESC (descending).

Only parts 1 and 2 are always present.

The third part is present if two tables (at least) are involved in the list of columns or of conditions.

The remainder is optional.

A-23—Examples of Canonical Queries

A-23-1

SELECT P_SN, P_NAME FROM PRODUCTS

Gives the list of columns {product serial number, product name}. The columns P_SN and P_NAME belong to the same PRODUCTS table. Hence, only a single table is involved and hence there is no third part (see A-22, above).

There is no restrictive condition on calculated columns which do not comprise any set function, nor are there any calculated columns which comprise set functions, nor is there any restrictive condition on calculated columns comprising set functions, and lastly, no sort.

A-23-2

SELECT P_SN, P_NAME FROM PRODUCTS
  WHERE P_SN<>'US1'
  ORDER BY P_NAME ASC

List of columns {product serial number, product name}. Restrictive condition: the product serial number is different from 'US1'

Sort command: product name, ascending.

A-23-3

SELECT PRODUCTS.P_SN, P_NAME, SUM(COST)
  FROM PRODUCTS, COMPONENTS
  WHERE PRODUCTS.P_SN=COMPONENTS.P_SN
    AND PRODUCTS. P_SN<>'US1'
  GROUP BY PRODUCTS.P_SN, P_NAME
  HAVING SUM(COST)>1000
  ORDER BY P_NAME ASC

List of columns {product serial number, product name, Sum(Cost)}

Restrictive conditions:

The product serial number is different from 'US1'
Sum(Cost)>1000

Sort commands: P_NAME ascending.

The Product serial number and Product name columns belong to the same PRODUCTS table. The Cost column belongs to the COMPONENTS table. Hence, two tables are involved and the third part of the query is 'PRODUCTS.P_SN=COMPONENTS.P_SN'.

When there is an ambiguity regarding the name of a column, SQL requests that the ambiguity be resolved by specifying in front of the name of columns which could lead to confusion the name of the table to which they refer (followed by a prescribed separator, in SQL a fullstop).

There is a calculated column which comprises a set function (sum) and hence the fifth part of the query is:
'GROUP BY PRODUCTS.P_SN, P_NAME'.

There is a restrictive condition on a calculated column comprising a set function and hence the sixth part of the query is:
'HAVING SUM(COST)>1000'.

A-24—"Near Dependency"

Consider a table with two columns and seven rows:

| COL1 | COL2 |
|------|------|
| A    | 1    |
| B    | 2    |
| A    | 1    |
| C    | 2    |
| D    | 3    |
| D    | 4    |
| D    | 4    |

The row D3 or the rows D4 block dependency, since D cannot simultaneously determine 3 and 4, if there is dependency.

A-25—Dependency by Lists

A-25-1—Example 1

| COL1 | COL2 |
|------|------|
| A    | a    |
| B    | b    |
| C    | a    |
| A    | a    | for COL1 the sets are:
  for "A", E11={row 1, row 4},
  for "B", E12={row 2},
  for "C", E13={row 3}.
for COL2 the sets are:
  for "a", E21={row 1, row 3, row 4},
  for "b", E22={row 2}

These sets may be manipulated for example as variables of an array (ARRAY) with two dimensions, the first for the relevant value, and the second for the list of rows, a character string with no space, where the rows are designated by their straightforward number, are separated by a comma, and are sorted in ascending order. If E1 and E2 are the names of these arrays for COL1 and COL2, we shall write for example:
  E1[1,1]="A" and E1[1,2]="1,4"
  E1[2,1]="B" and E1[2,2]="2"
  E1[3,1]="C" and E1[3,2]="3"
  E2[1,1]="a" and E2[1,2]="1,3,4"
  E2[2,1]="b" and E2[2,2]="2"

An even simpler notation (not borrowed from computing) will consist here in designating each set by the value which it relates to, i.e.:
  A="1, 4"
  B="2"
  C="3"
  a="1,3,4"
  b="2"

A-25-2—Example 2

| COL1 | COL2 |
|------|------|
| A    | a    |
| B    | b    |
| C    | a    |
| A    | a    |
| C    | b    |

For COL1 the sets are now;
E11={row 1, row 4},
E12={row 2},
E13={row 3, row 5}.
for COL2 the sets are now:
E21={row 1, row 3, row 4},
E22={row 2, row 5}

A-26

A-26-1

|       | COL1 | COL2 | COL3 |
|-------|------|------|------|
| Row 1 | A    | a    | α    |
| Row 3 | A    | a    | α    |
| Row 3 | B    | a    | α    |
| Row 4 | C    | b    | α    |
| Row 5 | D    | c    | β    |

A-26-2

| A: {1,2} | a: {1,2,3} | α: {1,2,3,4} |
| B: {3}   | b: {4}     | β: {5}       |
| C: {4}   | c: {5}     |              |
| D: {5}   |            |              |

A-26-3

A∩a=A B∩a=B C∩a=∅ D∩a=∅
A∩b=∅ B∩b=∅ C∩b=C D∩b=∅
A∩c=∅ B∩c=∅ C∩c=∅ D∩c=D

A-26-4

| TAB1 | | TAB2 | |
|------|--|------|--|
| A: {1,2} | a: {1,2,3} | {1bis} | α: {1bis,2bis} |
| B: {3}   | b: {4}     | {2bis} | β: {3bis}      |
| C: {4}   | c: {5}     | {3bis} |                |
| D: {5}   |            |        |                |

A-27

A-27-1

|       | COL1 | COL2 | COL3 |
|-------|------|------|------|
| Row 1 | A    | a    | α    |
| Row 3 | A    | a    | α    |
| Row 3 | B    | a    | α    |
| Row 4 | C    | b    | α    |
| Row 5 | D    | c    | β    |
| Row 6 | A    | c    | β    |

A-27-2

| A: {1,2,6} | a: {1,2,3} | α: {1,2,3,4} |
| B: {3}     | b: {4}     | β: {5}       |
| C: {4}     | c: {5,6}   |              |
| D: {5}     |            |              |

A-27-3

| A ∩ a = {1,2} ≠ A | B ∩ a = B | C ∩ a = ∅ | D ∩ a = ∅ |
| A ∩ b = ∅         | B ∩ b = ∅ | C ∩ b = C | D ∩ b = ∅ |
| A ∩ c = {6} ≠ A   | B ∩ c = ∅ | C ∩ c = ∅ | D ∩ c = D |

APPENDIX III

A-31
A-31-1
  SELECT COUNT (*) FROM TAB1
A-31-2
  SELECT COUNT (DISTINCT COL1) FROM TAB 1
A-31-3
  SELECT COUNT (DISTINCT COL1| |'xyz'| |COL2) FROM TAB1
A-31-4
  SELECT COUNT (DISTINCT COL1) FROM TAB1 WHERE COL1 LIKE "%xyz"
A-32
A-32-1
  SELECT COUNT (DISTINCT a.COL1| |'xyz'| |a.COL2) FROM TAB1 a
    WHERE a.COL1 IN
      (SELECT b.COL1 FROM TAB1 b GROUP BY b.COL1
        HAVING COUNT(DISTINCT b.COL1| |'xyz'| |b.COL2)>1)
      OR COL1 IS NULL'
A-32-2
  SELECT a.COL1, a.COL2, COUNT(a.COL1| |'xyz'| |a.COL2) FROM TAB1 a
    WHERE a.COL1 IN
      (SELECT b.COL1 FROM TAB1 b
        GROUP BY b.COL1
          HAVING COUNT(DISTINCT b.COL1| |'xyz'| |b.COL2)>1)
      OR a.COL1 IS NULL
    GROUP BY a.COL1, a.COL2
      ORDER BY a.COL1, COUNT (a.COL1| |'xyz'| |a.COL2)DESC
A-32-3
  UPDATE TAB1 SET COL2='VALUE2' WHERE COL2 IN ('VALUE2_1', 'VALUE2_2', . . . 'VALUE2$_n$') AND COL1='VALUE1'
A-32-4
  UPDATE TAB1 SET COL1='VALUE1' WHERE COL2 IN ('VALUE2_1', 'VALUE2_2',. . . 'VALUE 2_n') AND COL1 IS NULL
A-32-5
  UPDATE TAB1 SET COL1='VALUEIA' WHERE COL2 IN ('VALUE2_1', 'VALUE_2', . . . 'VALUE2_n') AND COL1='VALUE1'

A-33
A-33-1
  CREATE TABLE TAB2 AS SELECT DISTINCT S1, S2, . . . Sn FROM TAB1
  A-33-2
  CREATE TABLE TEMPO AS SELECT R1, R2, . . . Rp, S1 FROM TAB 1
  DROP TABLE TAB1
  RENAME TEMP TO TAB1
A-34
A-34-1
  CREATE VIEW TEMPO AS SELECT DISTINCT S1, S2, . . . Sn FROM TAB1
  CREATE TABLE TAB2
  AS SELECT S1, S2, . . . Sn, ROWNUM CODE_TAB2 FROM TEMPO
  DROP VIEW TEMPO
A-34-2
  CREATE TABLE TEMPO R1, R2, . . . Rp, CODE_TAB2
  AS SELECT R1, R2, . . . Rp, CODE_TAB2 FROM TAB1, TAB2
  WHERE TAB1.S1=TAB2.S1
  AND TAB1.S2=TAB2.S2
  AND TAB1.Sn=TAB2.Sn
  DROP TABLE TAB1
  RENAME TEMPO TO TAB1
A-35
  CREATE TABLE TAB1 (COL1 FORMAT1 COL2 FORMAT2 . . . COLn FORMATn)
A-36
  SELECT [DISTINCT] COL2 FROM TAB1 WHERE COL1="US1"
A-37
  Select [distinct] COL1 from TAB2

What is claimed is:

1. An improved processing device of the type that includes
  at least one computer (100, 200), furnished with a central unit (410) with a processor, at least one user peripheral, and a memory (440), which are run by an operating system (450), and
  a database management system (470), stored in the at least one computer, and able to cooperate with the operating system so as to allow a user to perform at least one of creation, input, and use of a database that comprises at least one data table (475) which can be broken down into rows and columns,
  wherein the improvement comprises:
    a means forming an autonomous meta-dictionary (510), for dynamically storing, with reference to the database, metadata information relating to the structure of each table of the database, and to the relationships between tables,
    an analysis means (520, 530, 550) for determining and storing at least temporarily a representation of groups of interrelated columns, and comprising a statistical tool (520) able to receive at least two ranked data sets presented to it, so a to determine relationships between these data sets, by enumerating distinct occurrences, the analysis means using at least the statistical tool for determining the representation of groups of interrelated columns, and
    a restructuring module (580, 590) capable of cooperating with the analysis means and the meta-dictionary with a view to establishing a modified version of the metadata information which takes account of at least one group of thus related columns, and to establishing for the user, at least in a create/input mode, a presentation or a view of the database which takes account of the modified version of the metadata information.

2. A device according to claim 1, wherein the analysis means further comprises:

an analysis module (530) capable of cooperating with the meta-dictionary so as to present the data of at least two different columns of a table to the statistical tool, so as to determine any relationship between them, with means (550) for storing at least temporarily a representation of groups of related columns, the analysis module (530) being devised so as to repeat the presentation of pairs of columns, until at least one is found whose two columns are related, or until the possibilities are exhausted in the database.

3. A device according to claim 2, wherein the analysis module (530) systematically carries out the presentation of all the possible pairs of different columns for the said table.

4. A device according to claim 2, wherein the analysis module (530) operates for all the tables of the database.

5. A device according to claim 2, wherein the statistical tool (520) is able to define:

a means (1024) for counting the number of distinct values ($N_i$, $N_j$) of each of the at least two data sets, a means (1034) for counting the number of distinct values (P) of the pairs formed by the data of like rank of the at least two data sets, and a means (1042–1049) for returning an information item to at least two charts, and which is representative of a comparison between the counts $N_i$, $N_j$ and P.

6. A device according to claim 5, wherein the statistical tool (520) is able also to define a means (1012) for counting a total number of distinct values (N) over a relevant group of columns, and wherein the analysis module (530) stores (550) the columns for which $N=N_i$, in the guise of candidate keys of a relationship starting from a current table.

7. A device according to claim 5, wherein the statistical tool (520) is devised so as to return different charts (1043, 1045, 1047, 1049), relating to comparisons pertaining to $N_i$, $N_j$ and P, and wherein the analysis module (530), when it presents the data of a pair of columns (COL1 and COL2) of a table to the statistical tool, is devised so as to react to the said charts, by storing (550) that:

if $N_i=P$ and $N_j=P$ then COL1 and COL2 mutually determine one another (interdependency), if $N_i=N_j$ and $N_i>P$ then COL1 determines COL2, if $N_i>N_j$ and $N_j=P$ then COL2 determines COL1, and otherwise COL1 and COL2 have no dependency relation.

8. A device according to claim 7, wherein the restructuring module comprises a restructuring means (580), associated with a user interface module (570), for allowing the user to select a starting table to be processed, columns to be processed from among at least one group of related columns, and a primary key of a new table to be chosen from among columns that are interdependent and a new key created for this purpose.

9. A device according to claim 8, wherein the restructuring means (580) are advised so as to exclude the primary key of the starting table from the said selections.

10. A device according to claim 8, wherein the restructuring means (580) are able to construct a new table with the data of a group of related columns, as well as a relationship key with the relevant table.

11. A device according to claim 10, wherein the relationship key is a column which remains in the relevant table, which is reduced so as to preserve this relationship key only, from among the said related columns.

12. A device according to claim 10, wherein the relationship key is a column created both in the new table and in the relevant table, which is reduced so as not to preserve any of the said related columns.

13. A device according to claim 8, wherein the restructuring means (580) are devised so as to operate the construction of a new table if a group of at least two related columns (COL1, COL2) has been identified by the analysis module.

14. A device according to claim 5, wherein the statistical tool (520) is also able to provide a means (1210) for counting the total number of pairs of distinct values of two data sets which block the dependency relation between these two sets, and, as appropriate, a means (1230) for counting the number of occurrences of each of these "blocking" pairs of distinct values, and for identifying them, whilst the analysis means (530) is devised to propose or perform (1250) modifications suitable for forcing dependency between the columns.

15. A device according to claim 1, wherein, in a data input mode, active means are provided for restricting, by default, modify access to a part only of the columns of a group of related columns, the others being simply read accessible.

16. A device according to claim 1, wherein, in a data input mode, active means are provided for compelling, by default, the data present in related columns of a row to remain consistent with at least partially identical data already existing in other rows.

17. A device according to claim 1, wherein the analysis means comprises a storage means that operates continuously, dynamically.

18. A device according to claim 1, wherein the at least one computer includes a server and at least one a "client", which are networked.

19. A device according to claim 1, wherein the database management system comprises a relational database management engine, drivable in the SQL language.

* * * * *